United States Patent
Shimada et al.

[19]

[11] Patent Number: 6,142,537
[45] Date of Patent: *Nov. 7, 2000

[54] CONNECTOR

[75] Inventors: Haruki Shimada, Nara-ken; Takeshi Dogochi, Nabari; Shinichi Nagai, Nabari; Shuichi Saga, Nabari, all of Japan

[73] Assignee: Nitta Moore Company, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/111,965

[22] Filed: Jul. 8, 1998

[30] Foreign Application Priority Data

Sep. 30, 1997 [JP] Japan ................................ 9-266061
Nov. 5, 1997 [JP] Japan ................................ 9-302845
Nov. 5, 1997 [JP] Japan ................................ 9-302846

[51] Int. Cl.[7] .................................................. F16L 37/00
[52] U.S. Cl. ......................... 285/308; 285/309; 285/319; 285/320
[58] Field of Search .................................... 285/305, 308, 285/319, 309, 320

[56] References Cited

U.S. PATENT DOCUMENTS

| 4,804,213 | 2/1989 | Guest | 285/308 |
|---|---|---|---|
| 5,090,747 | 2/1992 | Kotake | 285/308 |
| 5,104,158 | 4/1992 | Meyer et al. | 285/308 |
| 5,201,552 | 4/1993 | Hohmann et al. | 285/308 X |
| 5,356,183 | 10/1994 | Cole | 285/305 |
| 5,782,501 | 7/1998 | Brandt | 285/319 X |
| 5,897,145 | 4/1999 | Kondo et al. | 285/319 X |

FOREIGN PATENT DOCUMENTS

| 163947 | 9/1949 | Austria | 285/305 |
|---|---|---|---|
| 2442393 | 7/1980 | France | 285/319 |
| 5799266 | 1/1984 | Japan . | |

*Primary Examiner*—Lynne H. Browne
*Assistant Examiner*—David E. Bochna
*Attorney, Agent, or Firm*—Morrison Law Firm

[57] ABSTRACT

The connector includes a male member with an engaging portion on its outer face, a female member with an inner space for receiving the male member and a pair of manipulating members provided in the female member from opposite sides. The engaging portion of the male member is received through and behind the pair of manipulating members in the inner space. Each manipulating member has a part which enters the track region of the engaging portion and an elastic piece. The coupling of the male and female members is reliably obtained by two opposite side engagements between the engaging portion of the male member and the pair of manipulating members and maintained by the thrusting force by the elastic piece.

22 Claims, 24 Drawing Sheets

CONNECTOR

BACKGROUND OF THE INVENTION

The present invention relates to a connector for detachably coupling a male member and a female member by insertion, and more specifically a connector for coupling a male and a female member so as to allow fluid to pass therethrough.

A variety of connectors for detachably coupling a male and a female member by inserting the former into the latter have been developed. These connectors are often called as quick connectors.

One example is shown in FIGS. 30 to 32. In this connector, a bore space 31 of a female member 30 receives a male member 33 having an engaging portion 34 in a manner of having the portion 34 behind a manipulating ring 32.

In a usual state, the manipulating ring 32 is located at a coupling position where the ring 32 is not coaxial with the female member 30. When attaching or detaching the male member 33, the manipulating ring 32 is moved down to a male member receiving position (in a lower position in FIG. 31) where the ring 32 is substantially coaxial with the female member 30. Consequently, the bore space 31 of the female member 30 becomes clear for receiving the male member 33 or engagement between the engaging portion 34 of the male member 33 and the ring 32 is released for removing the male member 33.

In the coupling position, the manipulating ring 32 is thrust in an eccentric direction (in an upward direction in FIG. 31), and engaged with the engaging portion 34 of the male member 33 only on one side (the lower part of the engaging portion 34 in FIG. 32) like a cantilever. Therefore, when force acts on the male member 33 in a withdrawal direction, the coupling state is not stable.

SUMMARY OF THE INVENTION

It is therefore an object of the present invention to provide a connector in which more stable coupling than in prior art connectors is maintained if force acts on a male member in a withdrawal direction.

It is another object of the present invention to provide a connector in which a male member is more securely held than in prior art connectors.

In order to achieve these objects, the present invention includes the following technical means.

In the connector of the present invention, a male member has an engaging portion on its outer face and a female member has an inner space and is provided with a pair of manipulating members. The female member is designed to receive the male member with the engaging portion in its inner space so as to have the engaging portion behind the pair of manipulating members. The pair of manipulating members are provided into the female member from opposite sides, and respective inner end parts of the paired members enter in opposite inward directions a track region through which the engaging portion of the male member passes to and fro when being attached or detached. Here in the specification, the position where the pair of manipulating members are in the posture entering the track region is referred to as a coupling position. When attaching or detaching the male member, the pair of manipulating members are moved in opposite directions to retreat from the coupling position, and this position is below referred to as a released position. As a result, the full track region through which the engaging portion passes becomes clear. Or, when the male member has been engaged with the manipulating members, such an engagement is released.

Since the pair of manipulating members respectively enter the track region inwardly from the opposite sides near the inner circumferential wall of the female member, the manipulating members and the engaging portion are engaged with each other on both opposite sides. Therefore, even when force in a withdrawal direction is applied on the male member, the coupling engagement in this connecter is much more stable than the prior art connector in which only one side engagement is provided.

The pair of manipulating members may be formed separately from the female member, and designed to engage with retaining parts of a peripheral guide face of the inner space of the female member.

The paired manipulating members may have respective elastic pieces, which cause the manipulating members to enter the track region in opposite inward directions from the opposite sides and stay there in a usual state.

When detaching or attaching the male member, resisting the elasticity of the elastic pieces, the paired manipulating members are moved in opposite directions so as to retreat from the coupling position where the paired members invade the track region of the engaging portion of the male member.

The connector may include a tubular male member and a tubular female member, the male member being provided with an engaging portion on its outer face and the female member being provided with a pair of manipulating members having respective joining parts which engage with the engaging portion and keep a coupling state with the male member. Each joining part is provided with an abutting part for limiting further outward movement of the joining part at an axially shifted position in the coupling state of the male and female members.

In the coupling state of this connector, when fluid pressure is applied, the joining parts which engage with the engaging portion of the male member and serve to maintain the coupling state move in an axial direction due to the inner fluid pressure. The fluid pressure also acts on the joining parts to move them outwardly, however, at the axially shifted position, the outward movement of the joining parts is prevented by the abutting parts.

When coupling the male and female members together, the joining parts are moved outwardly and the male member is inserted into the female member. After this insertion, the joining parts are moved back to the previous usual position to engage with the engaging portion of the male member. On the other hand, when disengaging the male and female members apart, the joining parts are moved outwardly and the male member is drawn back from the female member.

The abutting part of the joining part may be formed in a step, and an associated movement arresting part may be provided on the female member. In this structure, when the joining part engages with the engaging portion of the male member and then moves axially due to inner fluid pressure, it also receives force to be moved outwardly, however, the abutting part of the joining part abuts against the associated movement arresting part of the female member to prevent the joining part from moving outwardly.

The stepped abutting part of the joining part may be alternatively formed in a slope. With this structure, inner fluid pressure moves the joining part axially and then inwardly along the slope. Therefore, the axial force on the joining part, for example, due to inner fluid pressure, may be transformed into a force to press and clasp the male member, and thereby further reliable coupling between the male and manipulating members is obtained.

The connector, which basically has the same structure as the above connector, may alternatively have a pair of manipulating members which outwardly rotate and move to retreat from the coupling position. In this connector, when coupling and removing the male member, the paired manipulating members are pushed in together, and rotated and moved outwardly to retreat from the coupling position. The retreat by outward rotation and movement allows to enlarge the size of the area which the manipulating members enter in the track region.

The paired manipulating members may be inserted in the female member from opposite sides and so that the insertion and removal of the male member can be done simply by pushing the paired members together by an operator's one hand and better maneuverability may be obtained.

Each of the paired manipulating members may have an elastic joining piece and an elastic removal guide piece. By thrusting action of both the elastic pieces, the paired members may be maintained to engage with the engaging portion of the male member. This simple structure of these elastic pieces allows the manipulating members to be preferably maintained in the coupling state. In coupling and removing the male member, the paired manipulating members are moved resisting the action of the elastic joining and removal guide pieces to retreat from the coupling position. With this simple structure and manipulation, the manipulating members are easily moved to retreat from the coupling position.

Another connector may have a further different type of manipulating member. This manipulating member has a leg which enters the track region about a half circular arc of the inner circumference of the female member. With this structure, the size of the area that the manipulating member occupies in the track region can be increased. As a result, the connecter in which the male member is held by more improved coupling strength can be provided.

Each of these manipulating members may be provided with an elastic joining piece and a removal preventing piece. The coupling state where the manipulating member invades the track region may be maintained by thrusting action of the elastic joining piece having a simple structure.

Furthermore, inner ends of the legs of the paired manipulating members may be designed to be stably put in place by engaging with and abutting against the respective counter manipulating members. And this restrains loose engagement therebetween.

The above and other objects, features and advantages of the present invention will become apparent from the following description in conjunction with the accompanying drawings.

DETAILED DESCRIPTION OF THE INVENTION

A connector of a first embodiment is shown in FIGS. 1 to 7. This connector includes a female member 1, a male member 2, and a pair of manipulating members 3.

Figure 1:
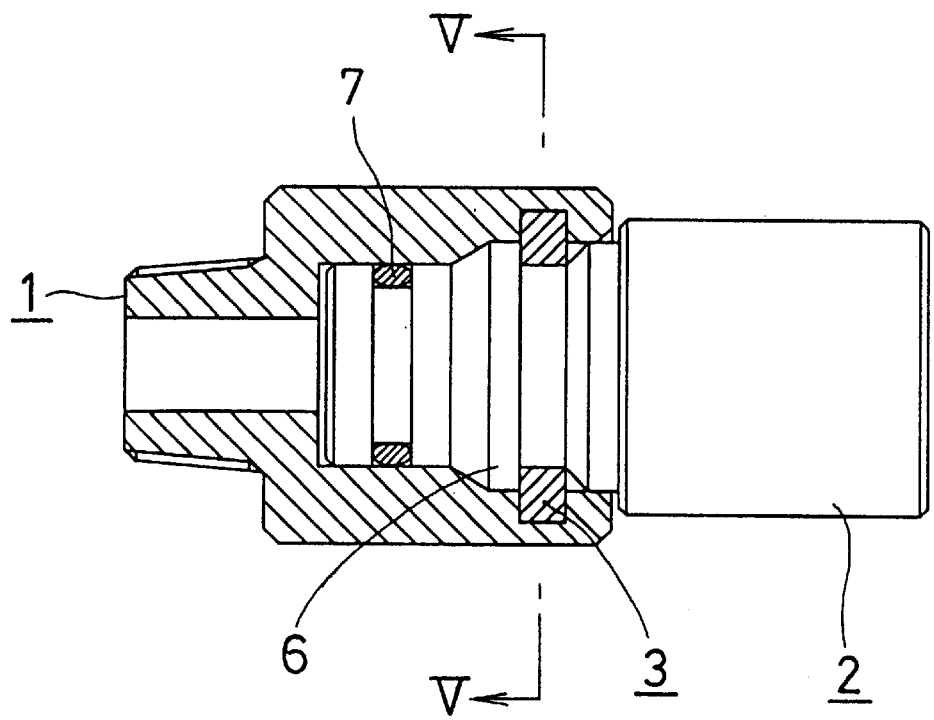
FIG. 1 is an axial partial section view showing sections of a female member, manipulating members and an O-ring according to a first embodiment of a connector of the present invention.
Figure 2:
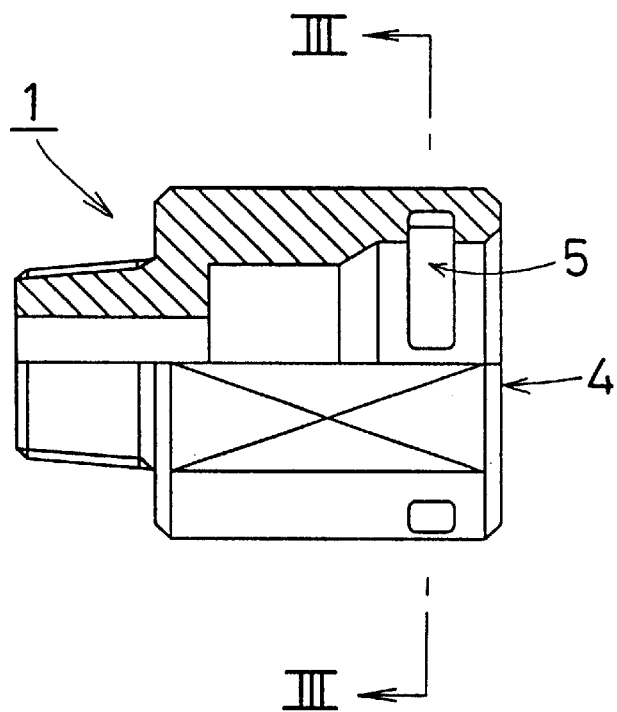
FIG. 2 is an axial half section view of the female member of the connector in FIG. 1.
Figure 3:
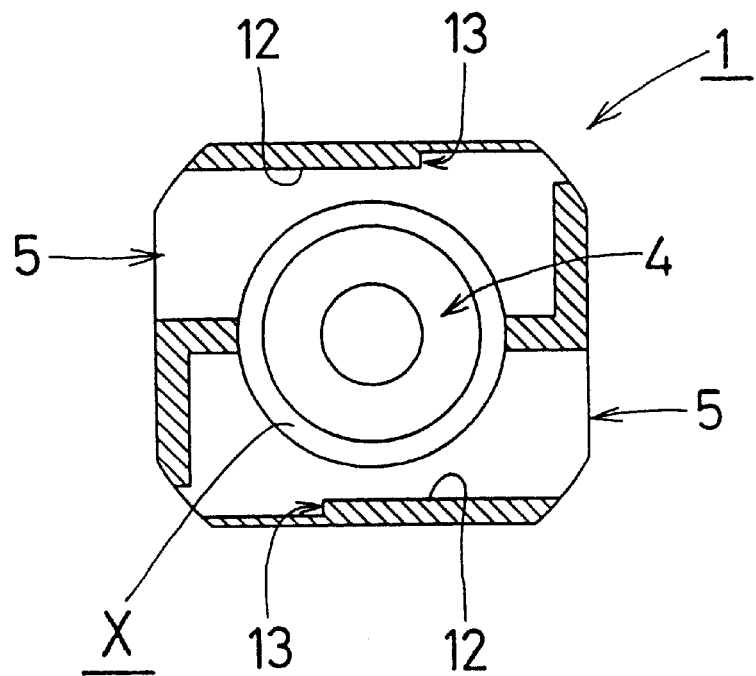
FIG. 3 is a section view of the female member, taken along the line III—III in FIG. 2.
Figure 4:
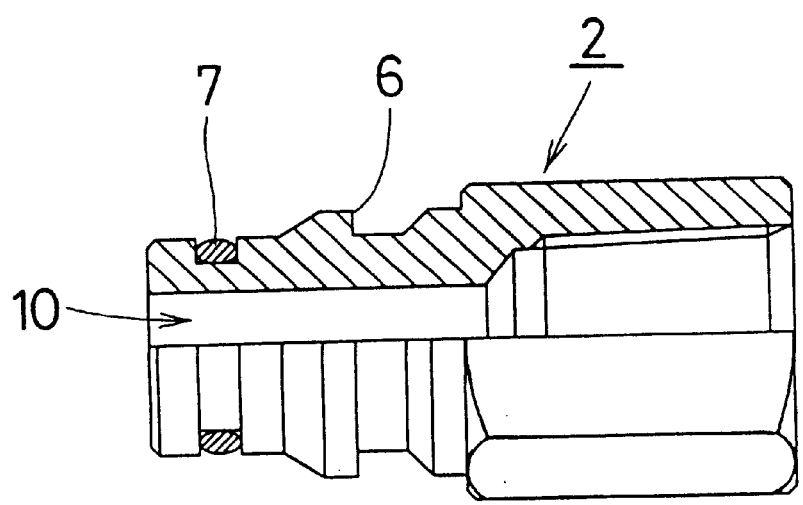
FIG. 4 is an axial half section view of the male member and the O-ring of the connector in FIG. 1.
Figure 5:
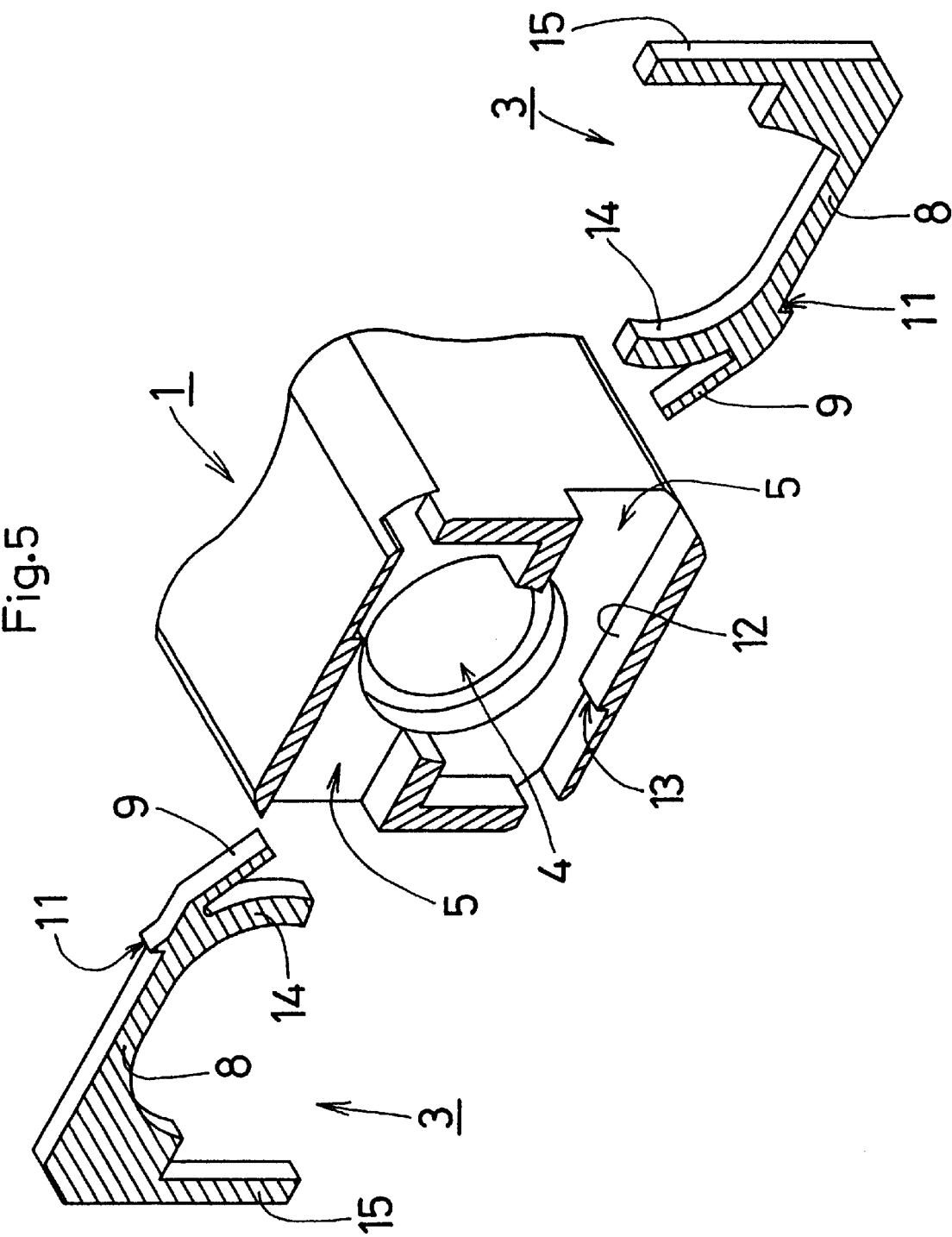
FIG. 5 is an exploded perspective view of the connector with no male member, with the section taken along the line V—V in FIG. 1.

As clearly shown in FIG. 5, the female member 1 has an inner space 4 and a pair of slits piercing its peripheral wall. The pair of manipulating members 3 are inserted into the pair of slits 5 from opposite sides. The male member 2 has a flange-shape engaging portion 6 on its outer face, as shown in FIG. 4. The inner space 4 receives the male member 2 in a manner to have the portion 6 behind the pair of manipulating members 3. An O-ring 7 is placed between the female and male members 1, 2.

Figure 6:
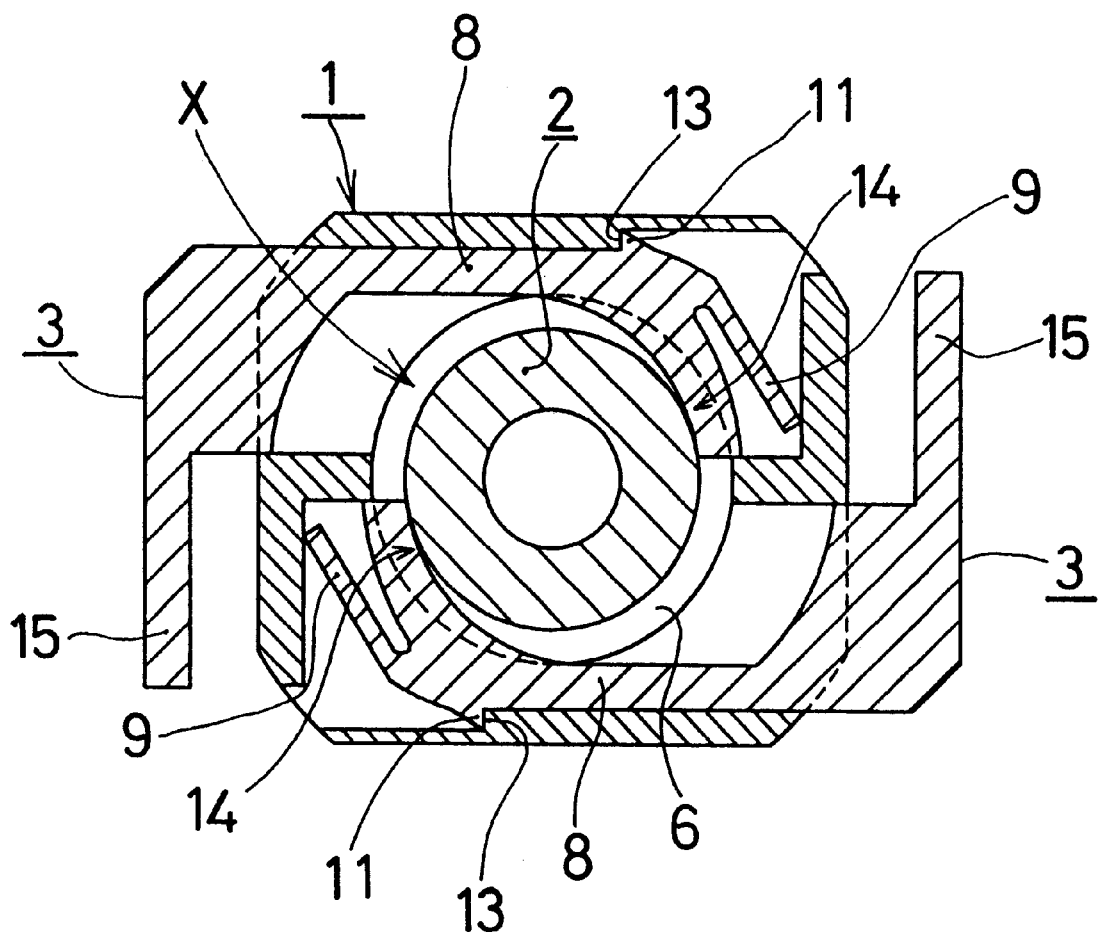
FIG. 6 is a section view of the connector in a coupling state, taken along the line V—V in FIG. 1.

The pair of manipulating members 3 are made of elastic material separately from the female member 1. Each manipulating member 3 is formed mainly with a manipulating base 15 and a leg 8 extending into the female member 1, and in a curved shape as a whole as illustrated in FIG. 5. The leg 8 bifurcates at its inner end. An outer bifurcation is an elastic piece 9 and an inner bifurcation is a joining part 14. Namely the leg 8 has the elastic piece 9 and the joining part 14 integrally. As shown in FIG. 6, the joining part 14 enters a track region X of the engaging portion 6 by pressing force of the elastic piece 9. The track region denotes here an annular region made by the axial to-and-fro movement of the engaging portion 6 (in another words, the axial movement of an annular part X in FIGS. 3, 6 and 7). And in the state of FIG. 6, respective joining parts 14 of the paired manipulating members 3 enter the track region in opposite inward directions from the inner peripheral wall of the female member 1.

The manipulating member 3 further includes a protrusion 11 with a triangle section on an outer face of the leg 8. The protrusion 11 is designed to engage with a stepped part 13 formed on a peripheral guide face 12 partly defining the inner space 4 of the female member 1. This engagement prevents abrupt removal of the manipulating member 3 from the female member 1.

Figure 7:
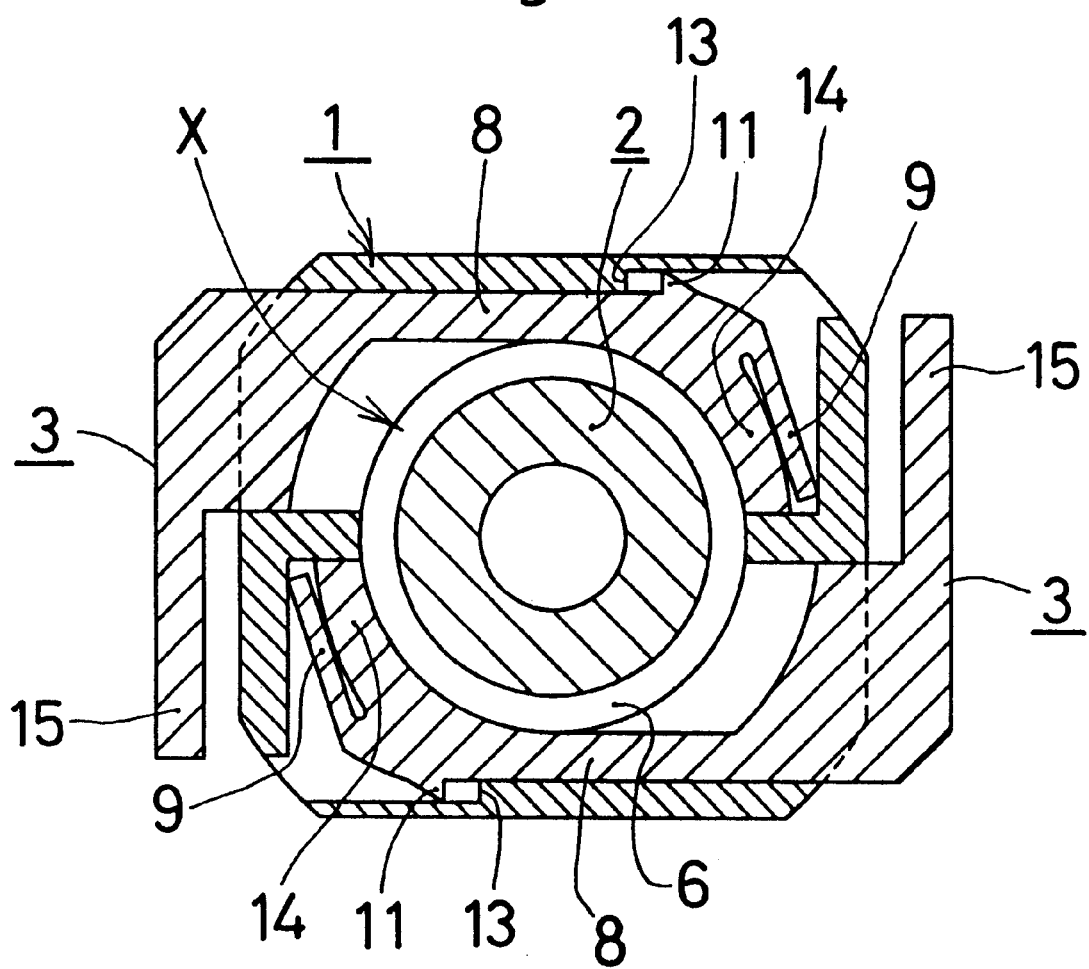
FIG. 7 is a line V—V section view of the connector of FIG. 1 in a state where the engagement between the male and manipulation members is released.

As shown in FIG. 7, when inserting or removing the male member 2, the manipulating bases 15 of the paired manipulating members 3 are manually pressed in opposite inward directions resisting the elasticity of the elastic pieces 9 to cause the joining parts 14 to move in opposite outward directions and retreat from the coupling position. As a result, the annular track region becomes clear or, if the engaging portion 6 has been engaged with the manipulating members 3, such engagement is released, and thereby the male member 1 may be inserted into or removed from the female member 1.

In this connector, the pair of manipulating members 3 respectively enter the annular track region in opposite inward directions from the inner peripheral wall side of the female member 1 and engage with the engaging portion 6 of the male member 2 on both opposite sides. Therefore, when force in a withdrawal direction is applied on the male member 2, as compared with the one side engagement in the conventional connector, much more stable coupling is advantageously obtained.

Figure 32:
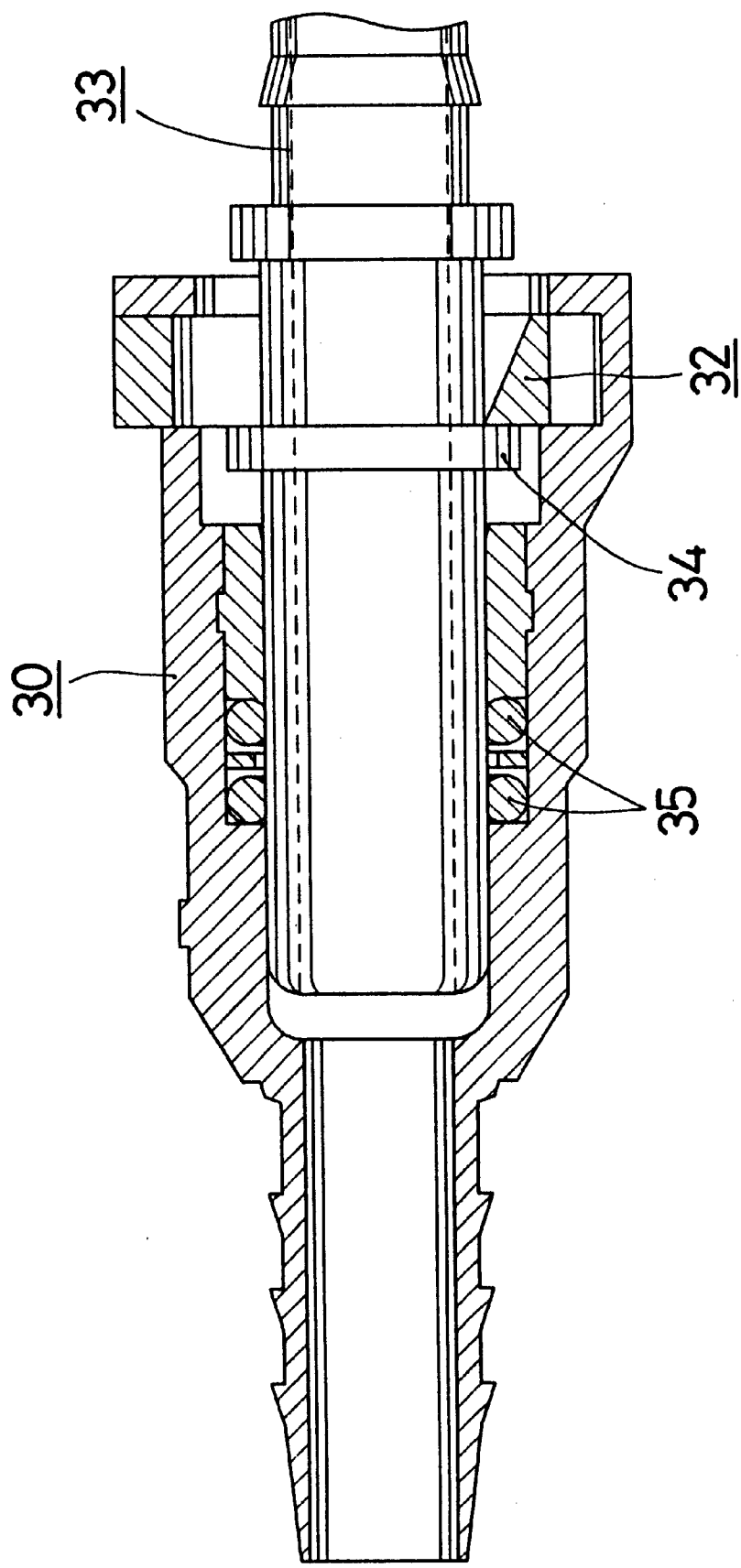
FIG. 32 is an axial section view showing a state where a male member is coupled with the female member through the manipulating ring in FIG. 30.

In the coupling state in the prior art connecter of FIG. 32, the manipulating ring 32 is always being pressed so as to be displaced in a specific direction (in a downward direction in the drawing). Therefore O-rings 35 placed between the male and female members 33, 30 are given force only in one single direction, and liable to deform in the course of time. With the connector according to the first embodiment of the present invention, the male member 2 receives force in opposite inward directions on both opposite sides so that uneven unidirectional force is not applied to the O-ring 7.

Figure 8:
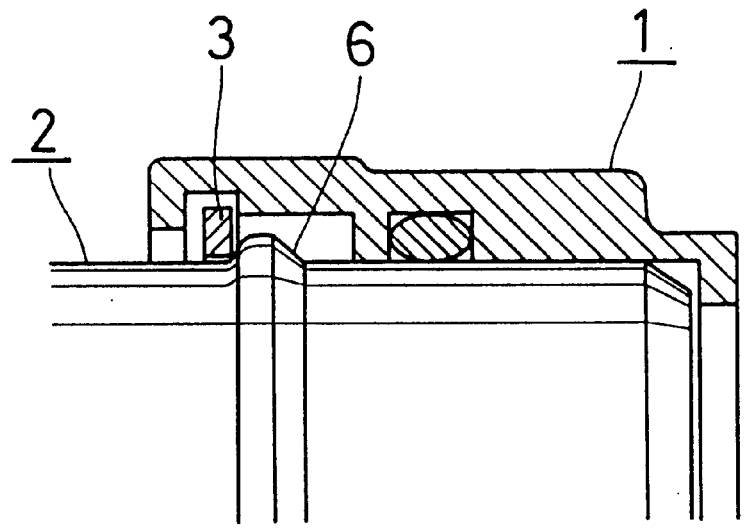
FIG. 8 is an enlarged partial section view of the connector in the same idea as in the first embodiment in a state where the male and female members are coupled.
Figure 9:
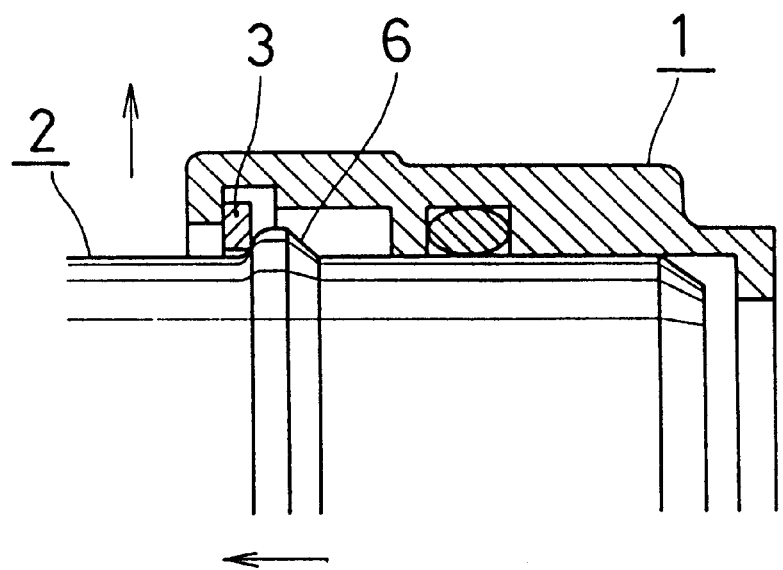
FIG. 9 is an enlarged partial section view of the connector in FIG. 8 in a state where fluid pressure acts on the coupled female and male members.

FIG. 8 shows a connector made by the same idea as in the first embodiment in a state where the female and male members are coupled by insertion. The annular protruded portion 6 (or the flange-shaped engaging portion 6) on the outer face of the male member 2 and the manipulating members 3 provided in the female member 1 are engaged and joined together. FIG. 9 shows the connecter in another coupling state where fluid pressure is applied. Fluid pressure pushes the manipulating members 3 not only in the axial direction but also outwardly (in an expanding direction), and thereby the coupling between the female and male members 1, 2 might be released to cause the fluid to flow out.

An improved connector, a second embodiment of the present invention, which solves the above problem and couples the female and male members 1, 2 more securely, is shown in FIGS. 10 to 20. This connector includes a tubular female member 1 made of synthetic resin, a tubular male member 2, and a pair of manipulating members 3 made of synthetic resin. The manipulating members 3 are inserted in the female member 1. This connector enables not only simple manipulation of attaching and detaching the male member 2 with and from the female member 1, but also stable coupling of the two members 1, 2.

Figure 10:
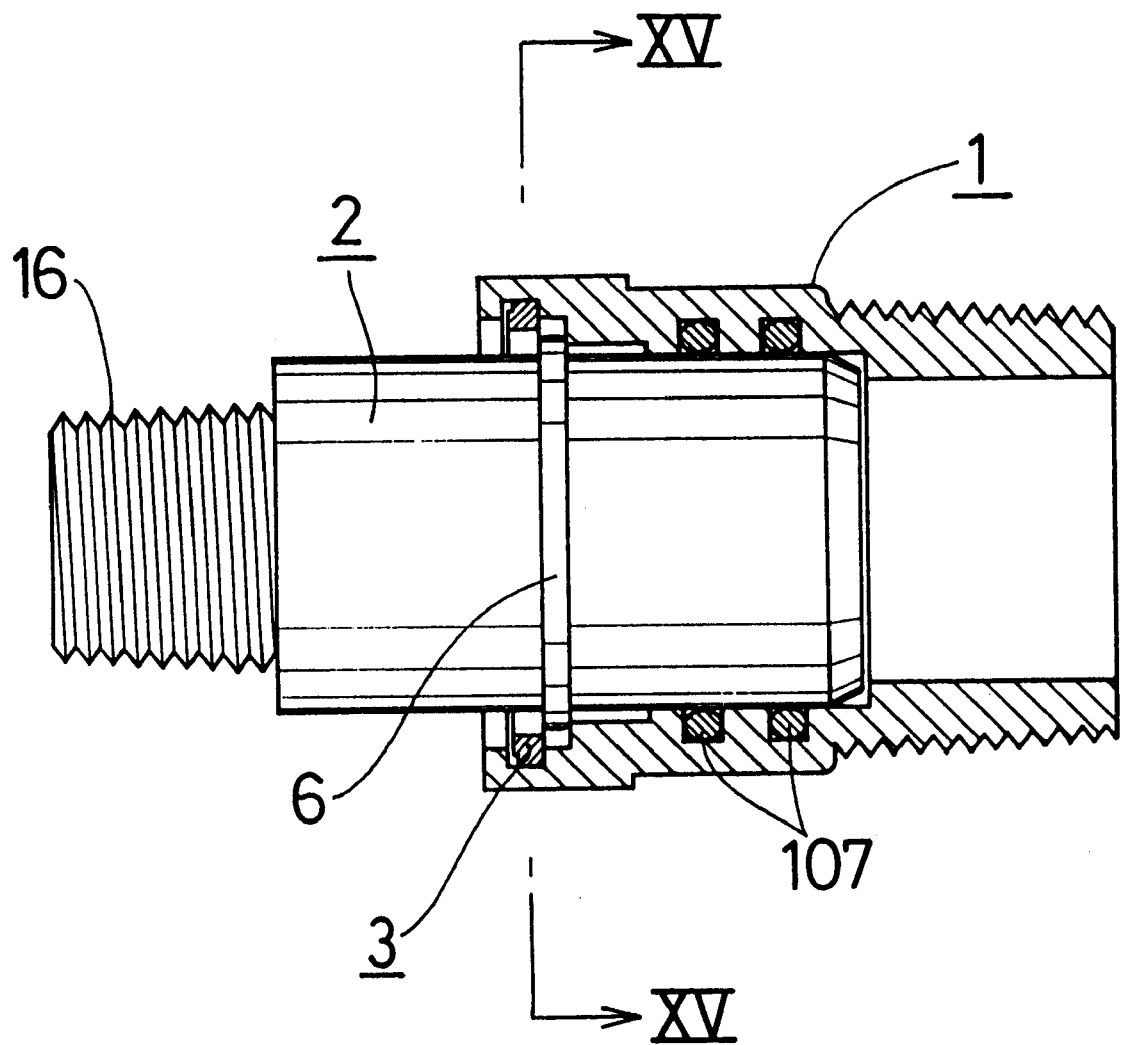
FIG. 10 is an axial partial section view of the connector according to a second embodiment of the present invention in a released state where manipulating members are displaced outwardly and a male member is inserted in a female member.
Figure 11:
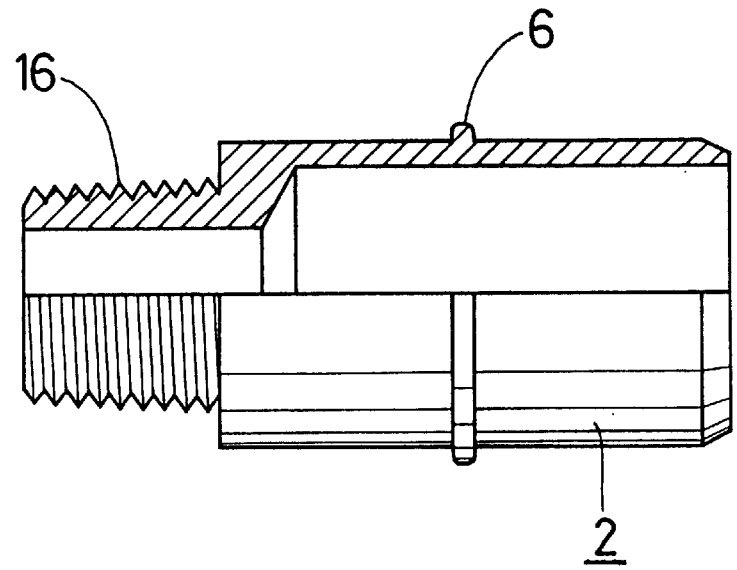
FIG. 11 is an axial half section view of the male member of the connector in FIG. 10.

As shown in FIGS. 10 and 11, the male member 2 has at one end a male threaded portion 16 for connecting to an associated device, and on its outer circumferential face an annular engaging protruded portion 6 as a stepped portion. The male member 2 may have a second protruded portion (not shown) axially in front (left side in FIGS. 10 and 11) of the first protruded portion 6, so that there is a recess between the two protruded portions and this recess functions as another type of stepped portion.

Figure 12:
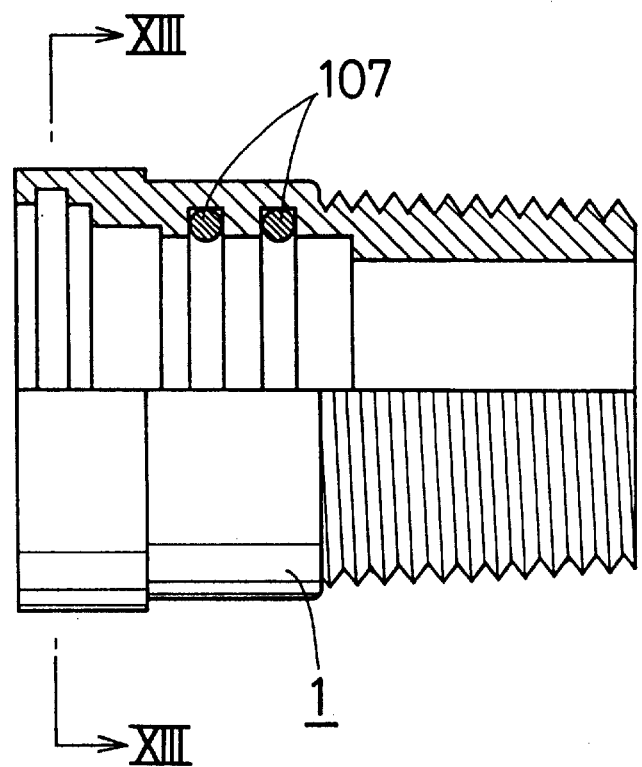
FIG. 12 is an axial half section view of the female member and the O-rings of the connector in FIG. 10.
Figure 13:
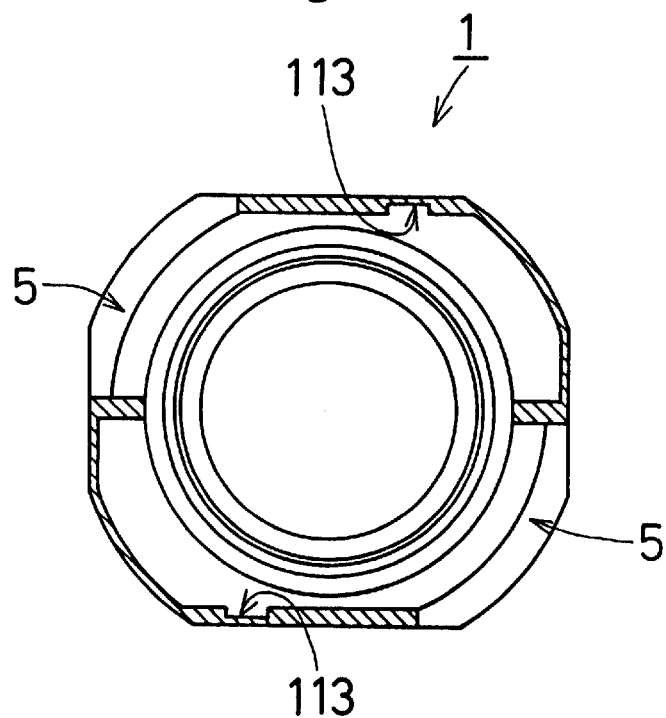
FIG. 13 is a section view of the female member of the connector, taken along the line XIII—XIII in FIG. 12.

As shown in FIGS. 10 and 12, the female member 1 accommodates two O-rings 107 therein, which lie between the female and male members 1, 2 when the latter 2 is inserted into the former 1. As clearly shown in FIG. 15, the female member 1 has two slits which are provided opposingly on its peripheral wall and respectively penetrating the wall. The pair of manipulating members 3 are inserted into the female member 1 through the slits in opposite inward directions. The female member 1 receives the protruded portion 6 of the male member 2 through and behind the pair of manipulating members 3.

Figure 14:
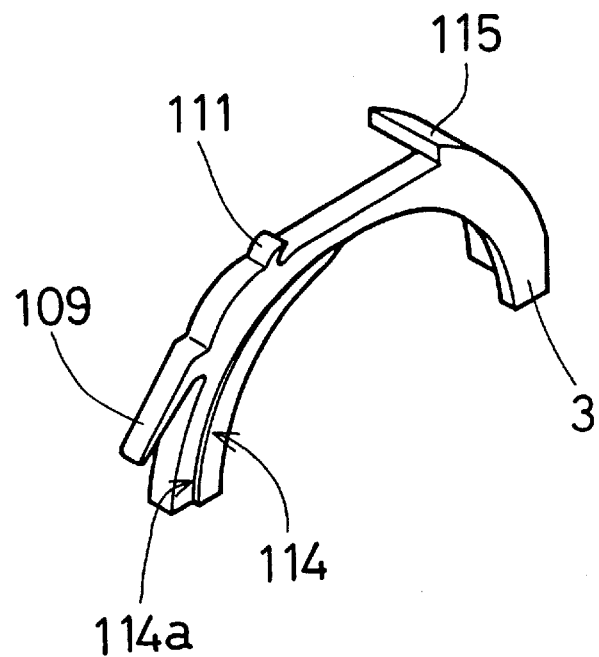
FIG. 14 is a perspective view of one manipulating member of the connector in FIG. 10.
Figure 15:
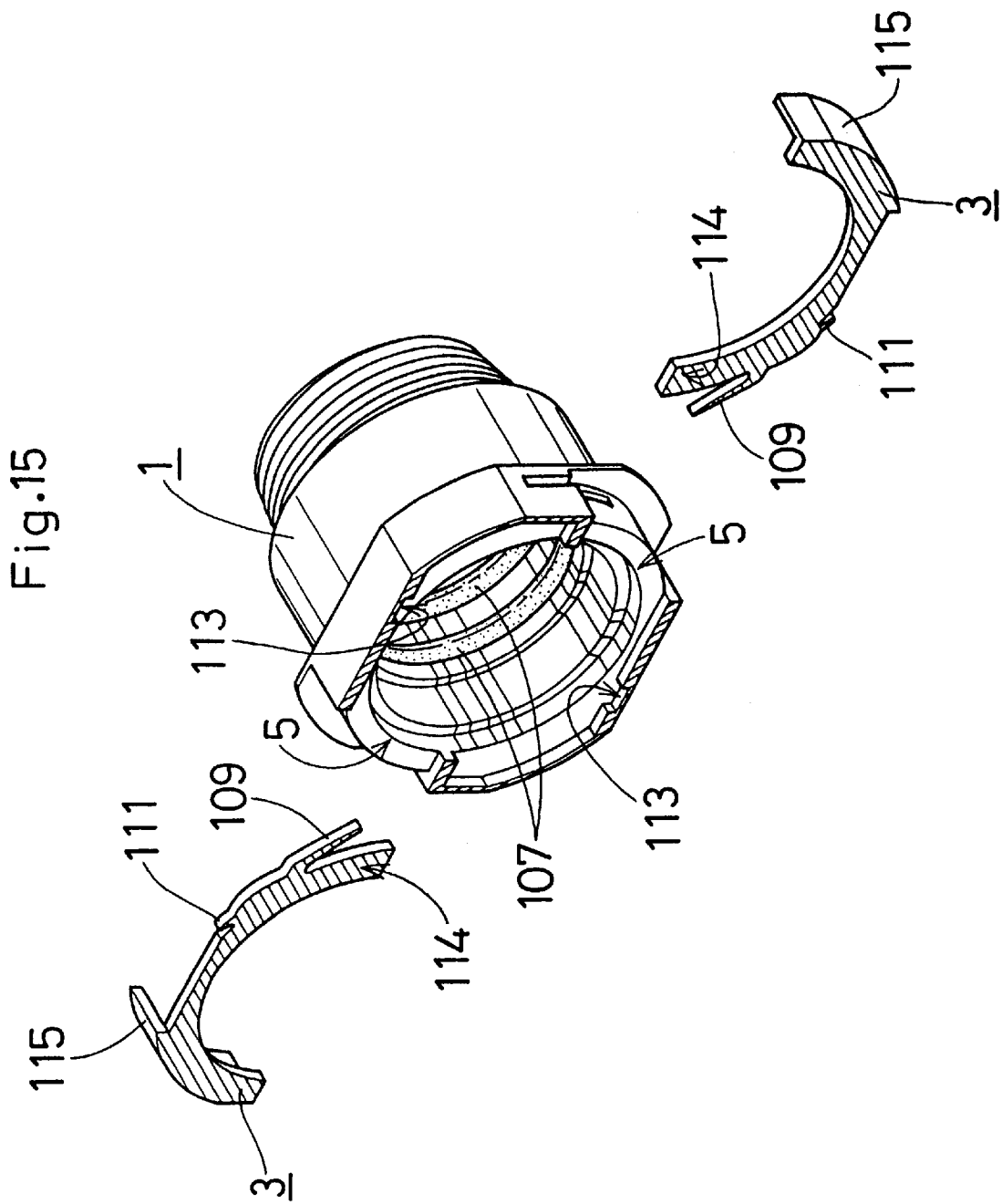
FIG. 15 is a perspective exploded view of the connector with no male member, with the section taken along the line XV—XV in FIG. 10.
Figure 16:
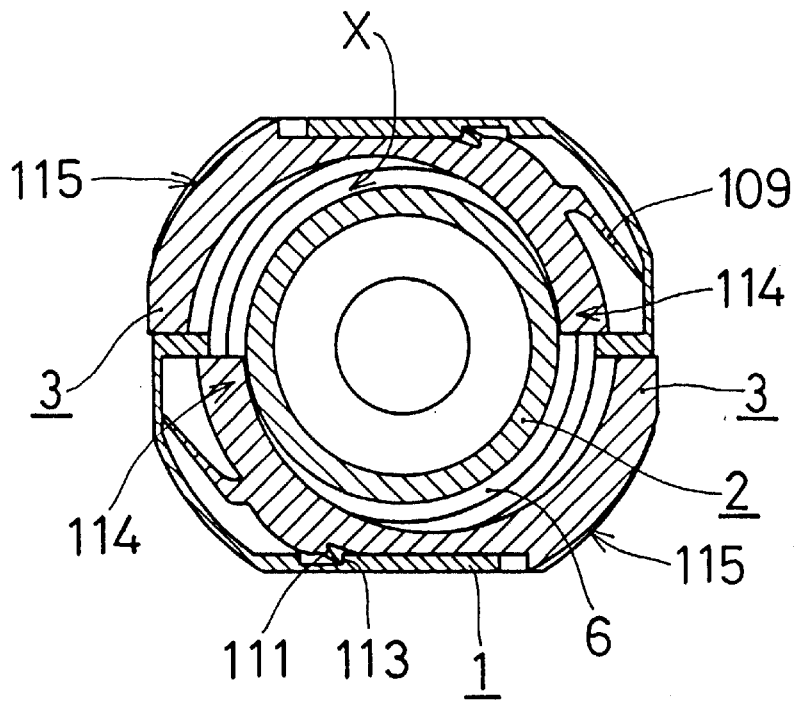
FIG. 16 is a line XV—XV section view of the connector of FIG. 10 in a coupling state where the manipulating members engage with a protrusion of the male member.
Figure 17:
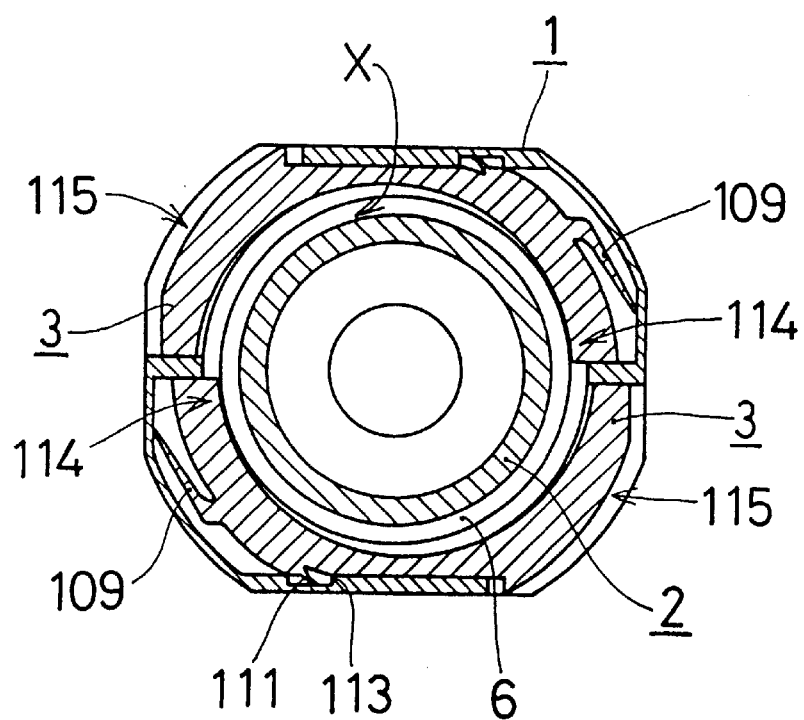
FIG. 17 is a section view of the connector in the released state, taken along the line XV—XV in FIG. 10.
Figure 18:
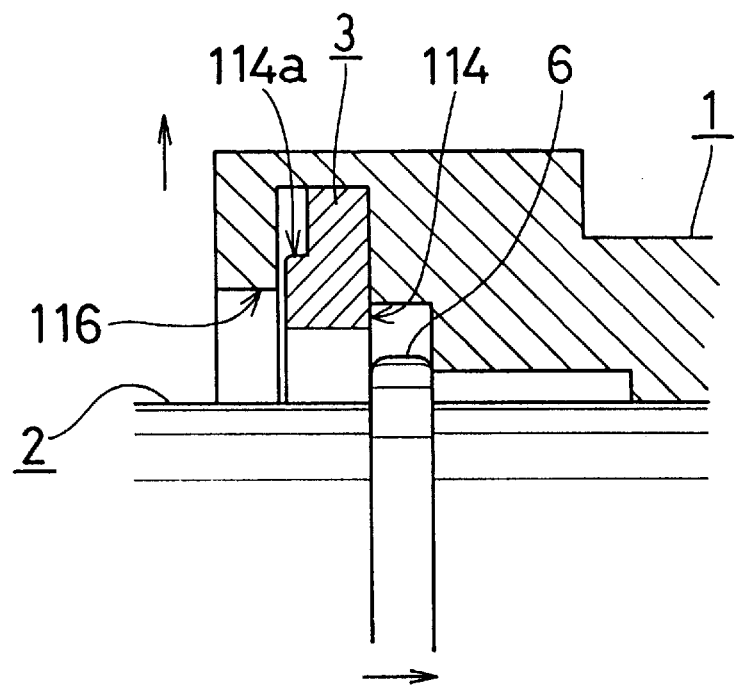
FIG. 18 is a partially enlarged axial section view showing the relation among the female, male and manipulating members in FIG. 10.

Referring to FIGS. 14 and 15, each manipulating member 3 is formed in a substantially semi-arc shape and made of synthetic resin. The member 3 has a manipulation base 115 and a leg extending into the inside of the female member 1. The leg bifurcates at its inner end. An outer bifurcation is an elastic piece 109 and an inner one is a joining part 114 which engages with the annular protruded portion 6 of the male member 2 so as to maintain the engagement therewith. The member 3 further has a hook-like protrusion 111 on an outer side of the semi-arc leg section so as to engage with an arresting part 113 formed on a peripheral guide face partly defining the inner space of the female member 1. This engagement prevents abrupt removal of the manipulating member 3 from the female member 1.

The joining part 114 of the paired manipulating members 3 respectively crossingly enter an annular track region of the protruded portion 6 of the male member 2 by the pressing force of the respective elastic pieces 109. Here the track region is made by the axial movement of the annular part X in FIG. 17. As shown in FIGS. 14 and 18 to 20, each joining part 114 is provided with an abutting part 114*a* which limits the outward movement of the joining part 114 when the joining part 114 slightly moves in the axial direction in a coupling state of the members 1, 2 in FIG. 20. Here the outward movement denotes a movement in a radially outward or expanding direction in the whole connector, and the axial movement denotes a withdrawal movement of the male member 2.

The abutting part 114*a* is shaped in a step. In a coupling state, fluid pressure is applied on the joining part 114 to move it outwardly and axially. The joining part 114 slightly moves axially engaging with the protruded portion 6 of the male member 2 and also receives the pressure to move outwardly, however, this outward movement is prevented by the abutment of the abutting part 114*a* against an associated movement arresting part 116 of the female member 1.

Figure 19:
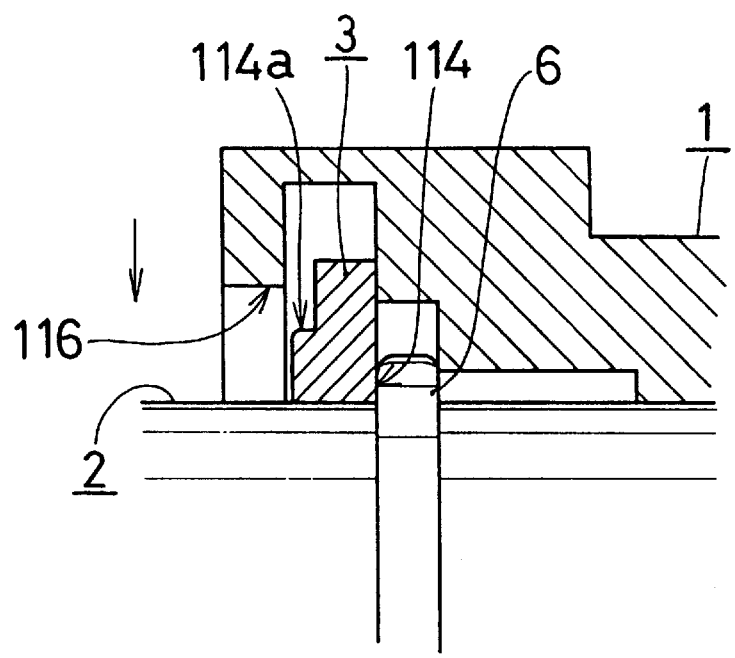
FIG. 19 is a partially enlarged axial section view of the connector of FIG. 10 in a state where the manipulating member elastically transforms back and engages with the protrusion of the male member.

When detaching or attaching the male member 2, the manipulating bases 115 of the paired manipulating members 3 are pushed in mutually opposite inward directions manually or with a tool (not shown) resisting the elasticity of the elastic pieces 109 so that the paired members 3 move to retreat from the coupling position where the joining parts 114 have been in the track region. More specifically, when attaching, the joining parts 114 are moved outwardly so as to clear the track region, the male member 2 is inserted into the female member 1 (see FIG. 10), and then, the joining parts 114 are allowed to elastically return to a usual coupling position where the parts 114 engage with the protruded portion 6 of the male member 2, as shown in FIG. 19. On the other hand, when detaching, the joining parts 114 are likewise moved outwardly to retreat from the coupling position, and then the male member 2 is pulled out.

Figure 20:
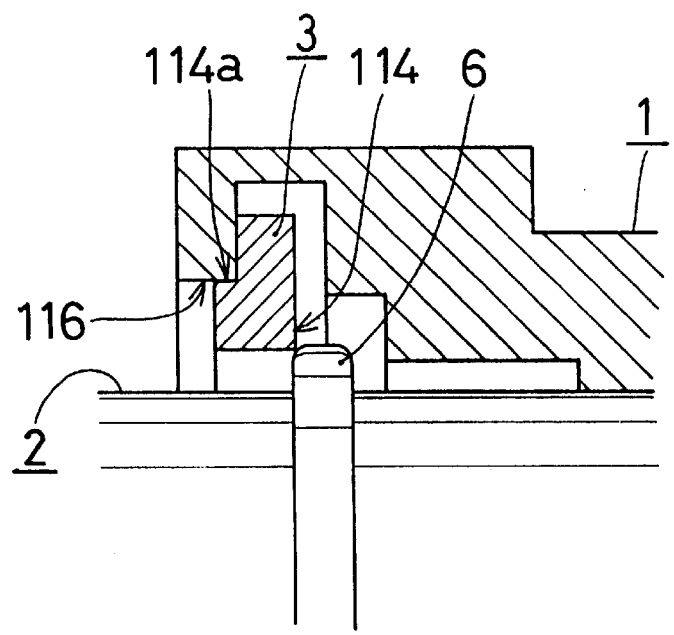
FIG. 20 is a partially enlarged axial section view of the connector of FIG. 10 in a state where the manipulating member engages with the protrusion of the male member and moves in axial and outward directions.

In actual use, when fluid passes through the connector, the inner fluid pressure moves the joining part 114, which engages with the male member 2 and its protruded portion 6 and maintains the engagement therewith, slightly in the axial direction. Or, in advance, the joining part 114 may be moved together with the male member 2 slightly in the axial direction with respect of the female member 1. At this axially shifted position, outward expanding movement of the joining parts 114 is limited by the abutting part 114*a*. As a result, the coupling state where the joining parts 114 on the female member side and the protruded portion 6 of the male member 1 is kept securely as shown in FIG. 20.

It is therefore advantageous in the present invention that abrupt disengagement of the male member 2 from the female member 1 is less likely to happen. It is further advantageous that engagement between the stepped abutting part 114*a* of the joining part 114 and the associated movement arresting part 116 of the female member 1 reliably limits further outward movement of the joining part 114.

The male member 2 is readily removed from the female member 1 as follows. Fluid is stopped passing through the connector, the male member 2 in the axially shifted position is pushed back deeper into the female member 1 so as to release the engagement between the abutting part 114*a* and the movement arresting part 116, the pair of manipulating members 3 are moved in opposite outward directions to retreat from the coupling position where the manipulating members 3 stay in the track region and into a released position where the manipulating members 3 are disengaged from the protruded portion 6 as shown in FIG. 10, and finally the male member 2 is pulled out from the female member 1.

Since the paired manipulating members 3 enter the annular track region from the opposite sides of the inner space of the female member 1, the manipulating members 3 engage with the protruded portion 6 of the male member 2 on the both opposite sides. Therefore, even when force in the withdrawal direction is applied on the male member 2, this two side coupling state is much more stable than the one side coupling in the prior art connector.

Figure 21:
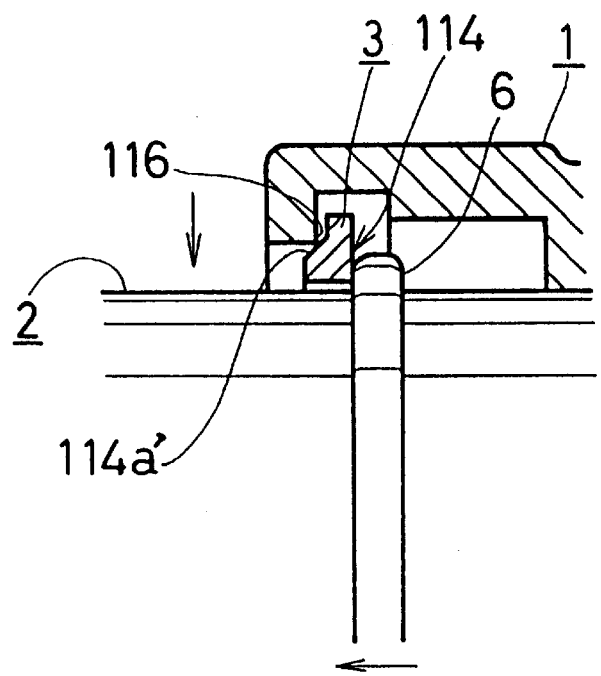
FIG. 21 is a partially enlarged axial section view of the connector according to a third embodiment of the present invention in the same state as FIG. 20.
Figure 22:
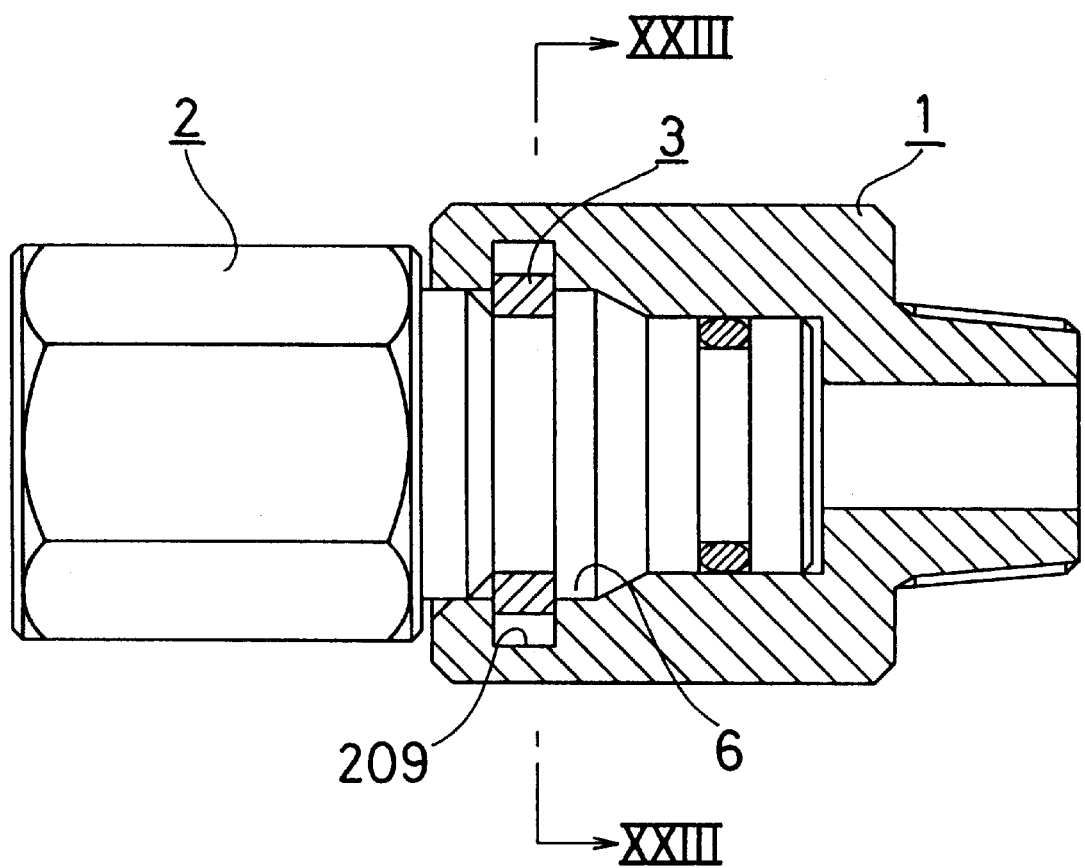
FIG. 22 is an axial partial section view showing sections of a female member, manipulating members and an O-ring according to a fourth embodiment of a connector of the present invention.

A third embodiment according to a connector of the present invention, as shown in FIG. 21, is described below mainly pointing out the difference from the above second embodiment.

The joining part 114 of the manipulating member 3 in the third embodiment has a sloped abutting part 114*a*', instead of a step in the second embodiment. Consequently, when the joining part 114 moves together with the male member 2 in the axial direction due to the internal fluid pressure, the joining part 114 also moves in the inward contracting direction (in the downward direction in FIG. 21) along the sloped abutting part 114*a*' and presses the male member 2 accordingly. Namely, the axial moving force of the joining part 114 together with the male member 2 due to the inner fluid pressure is transformed into an engaging force which pressingly clasps the male member 2 by the joining parts 114. This advantageously provides more reinforced coupling between the female and male members 1, 2.

Referring back to FIGS. 6 and 7, the inner space of the female member 1 receives the engaging portion 6 of the male member 2 through and behind the pair of manipulating members 3. As indicated by dotted line in FIG. 6, respective parts of the joining parts 14 of the manipulating members 3 crossingly enter the track region of the engaging portion 6. When detaching or attaching the male member 2, the pair of manipulating members 3 are moved being pressed in the opposite directions toward the respective inner ends so that the joining parts 14 retreat from this coupling position and disengage from the engaging portion 6 of the male member 2.

The strength of the coupling of the male member 2 (in other words, reliability of non-removal of the member 2) depends on, for example, the size of the area of the part of each joining part 14 which enters and occupies in the track region (shown by dotted line). There has been a demand for enhancing the strength of coupling between the female and male members 1, 2.

A connector to answer the foregoing demand, a fourth embodiment of the present invention, is shown in FIGS. 22 to 25. The connector includes a male member 2 having a passage 10 for fluid and a flange-shaped engaging portion 6 on its outer face, a synthetic resin female member 1 having an inner space and a pair of manipulating members. The female member 1 receives in its inner space the flange-shaped engaging portion 6 of the male member 2 through and behind the pair of manipulating members 3. The female member 1 also receives the pair of manipulating members 3 from opposite sides.

Figure 23:
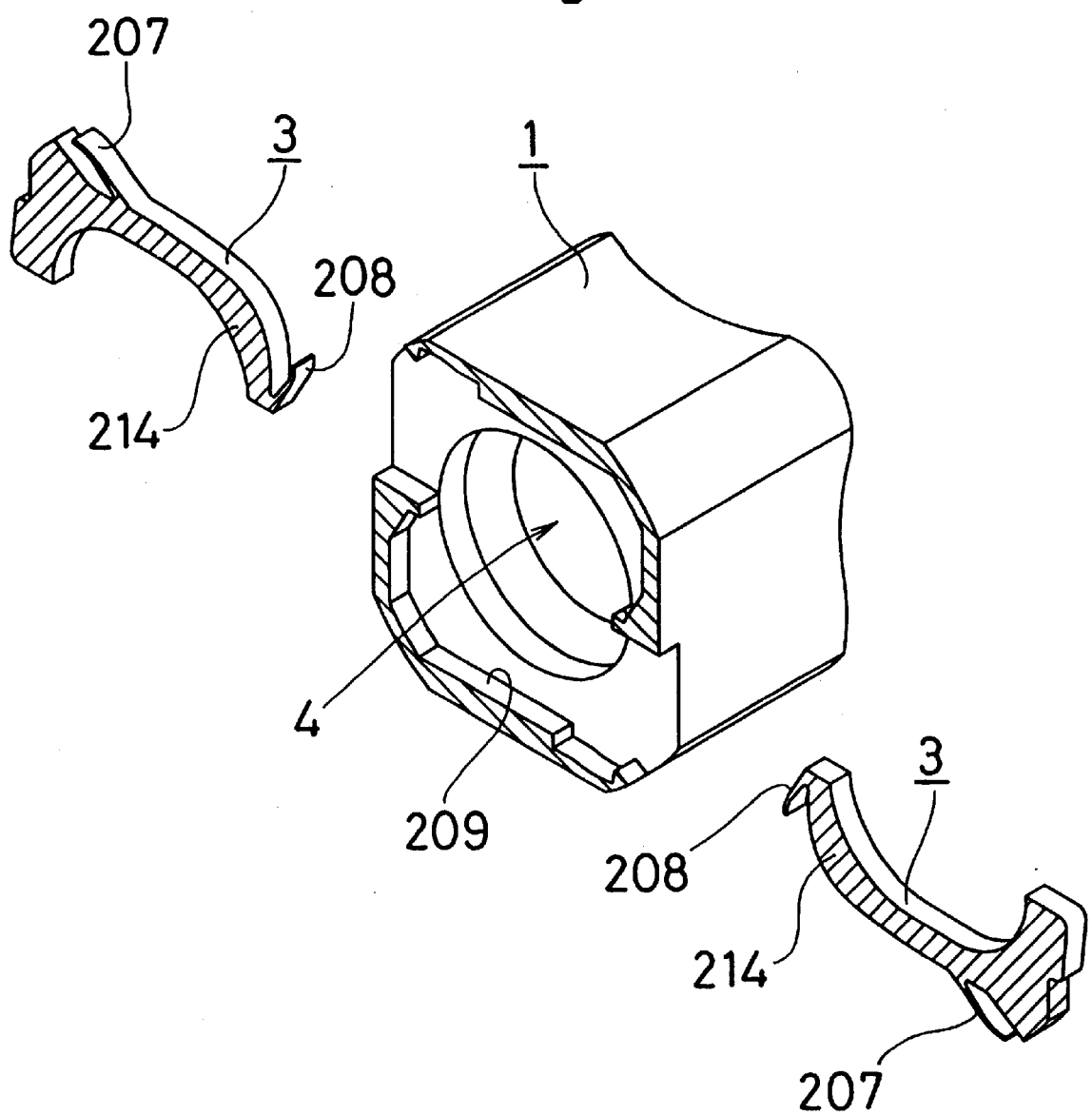
FIG. 23 is an exploded perspective view of the connector with no male member, with the section taken along the line XXIII—XXIII in FIG. 22.
Figure 24:
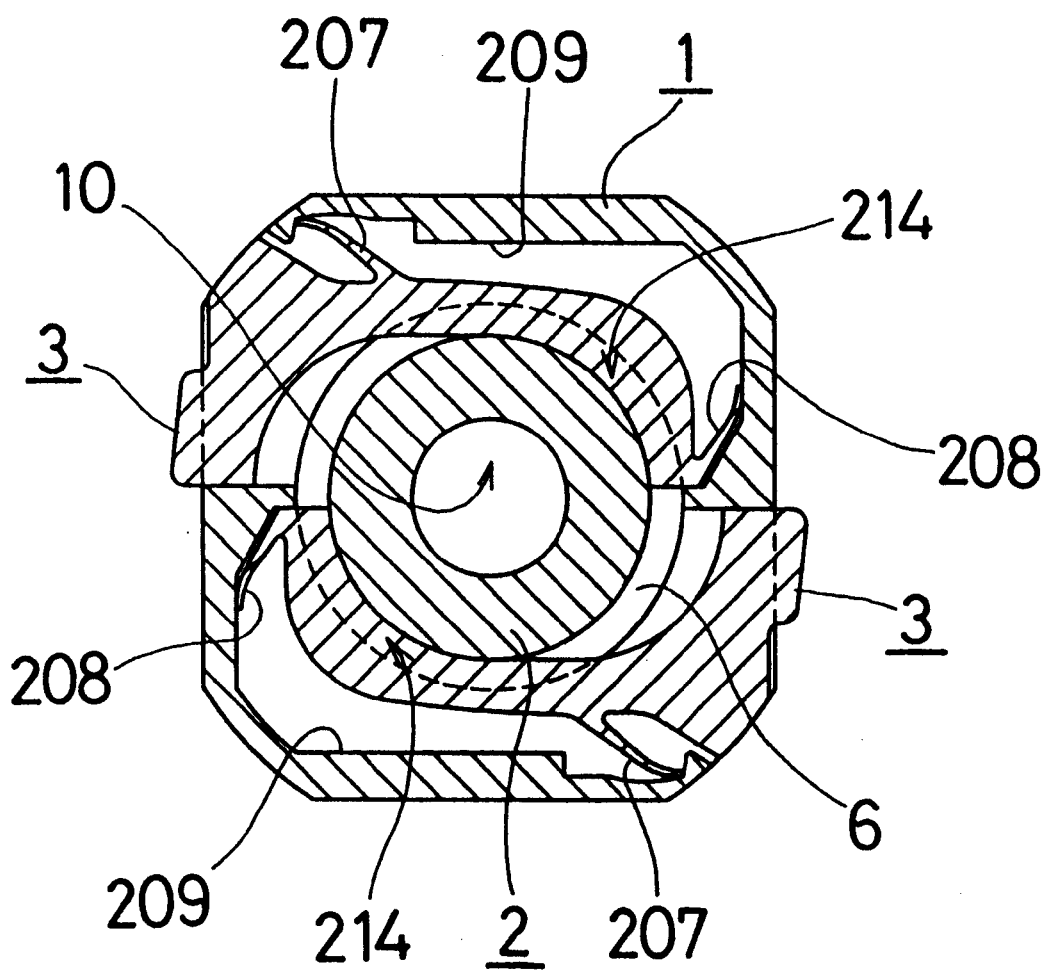
FIG. 24 is a line XXIII—XXIII section view of the connector in FIG. 22.
Figure 25:
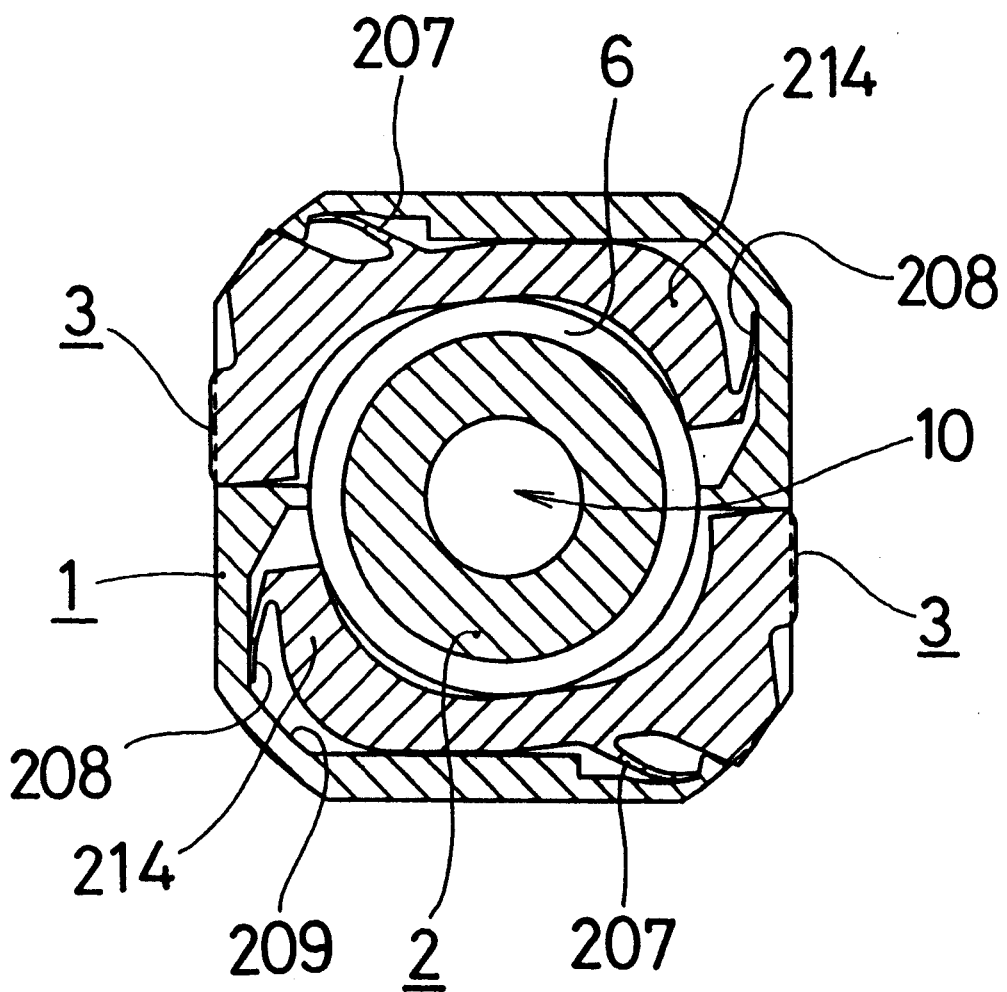
FIG. 25 is a line XXIII—XXIII section view of the connector of FIG. 22 in a state where the engagement between the male and manipulating members is released.
Figure 26:
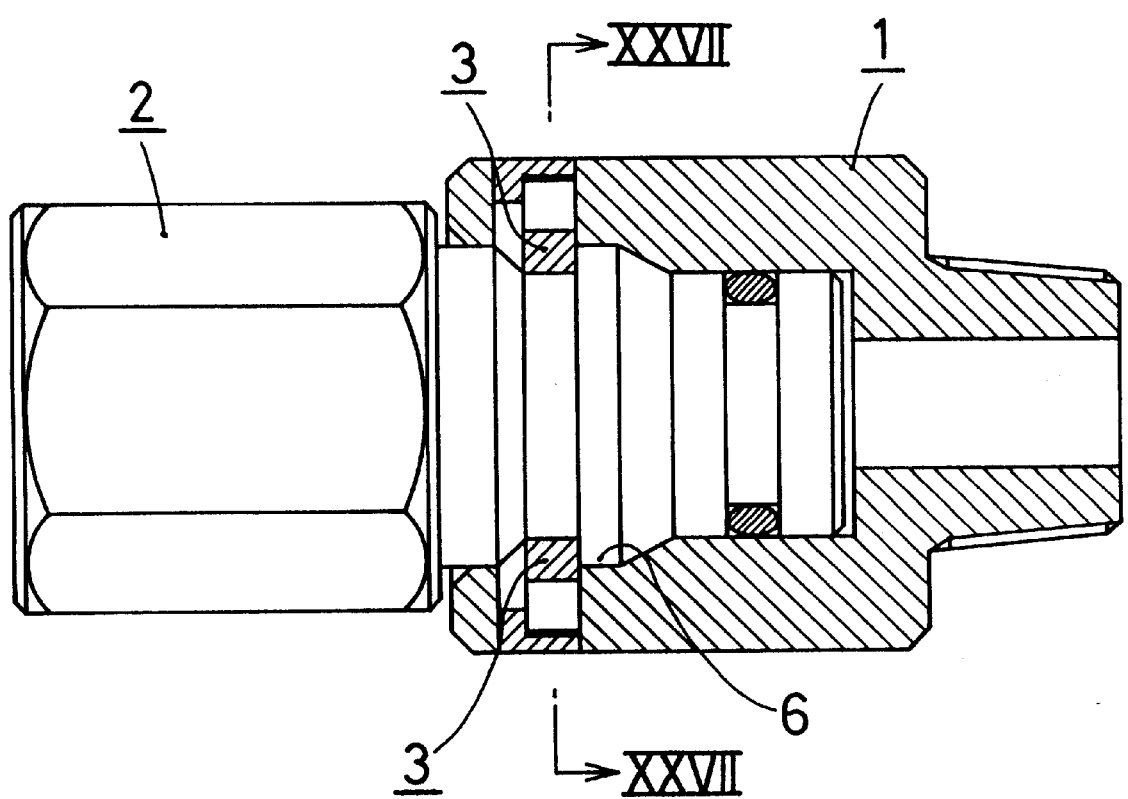
FIG. 26 is an axial partial section view showing sections of a female member, manipulating members and an O-ring according to a fifth embodiment of a connector of the present invention.
Figure 27:
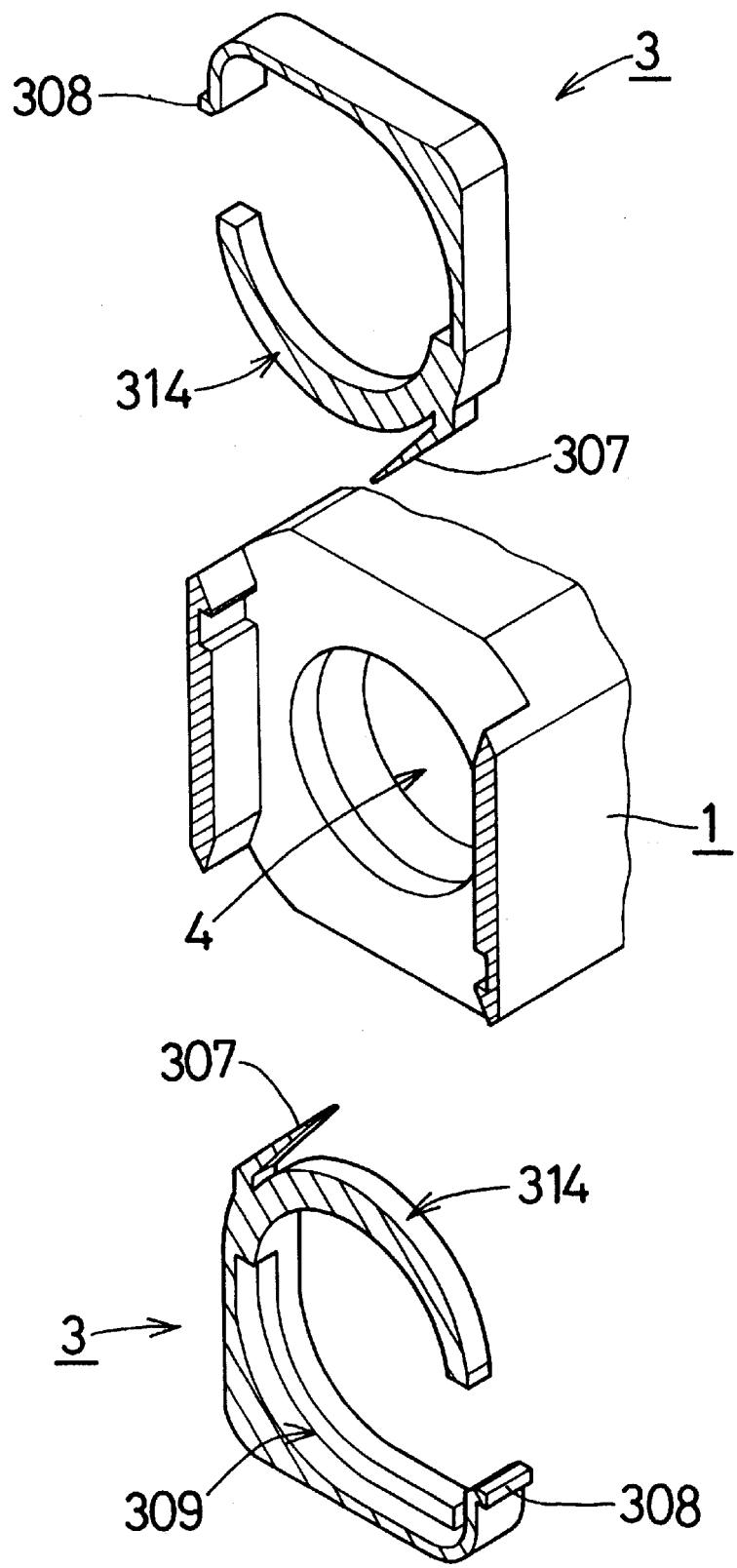
FIG. 27 is an exploded perspective view of the connector with no male member, with a section taken along the line XXVII—XXVII in FIG. 26.
Figure 28:
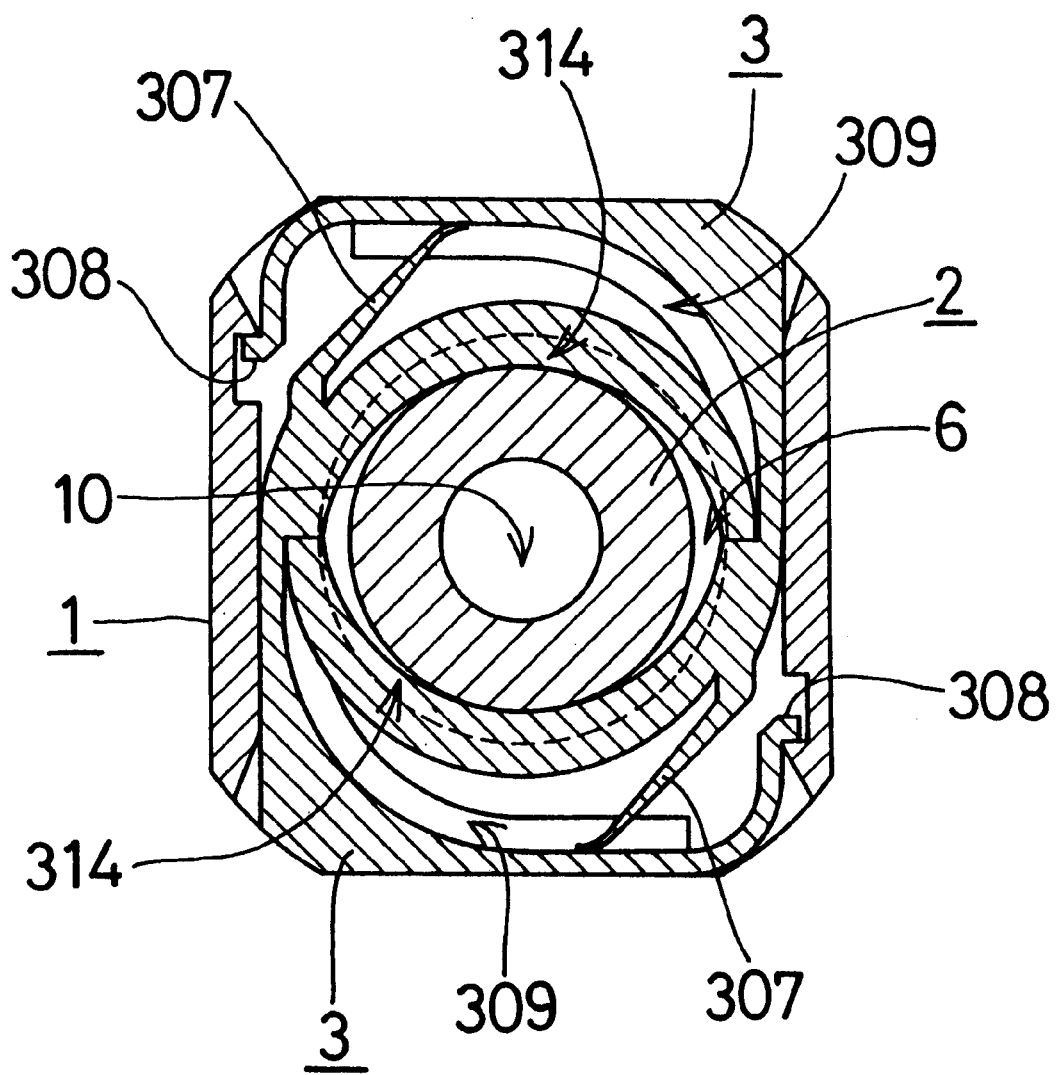
FIG. 28 is a section view of the connector taken along the line XXVII—XXVII in FIG. 26.
Figure 29:
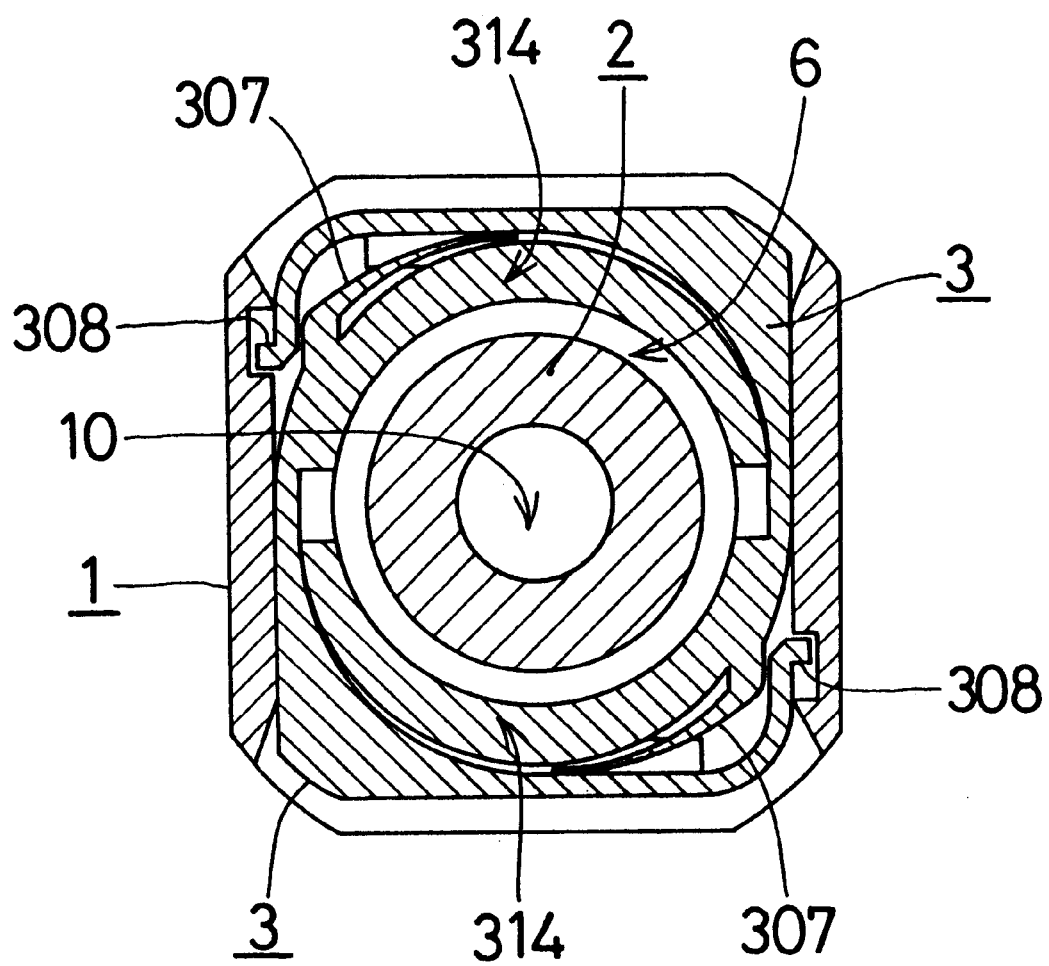
FIG. 29 is a line XXVII—XXVII section view of the connector of FIG. 26 in a state where the engagement between the male and manipulating members is released.
Figure 30:
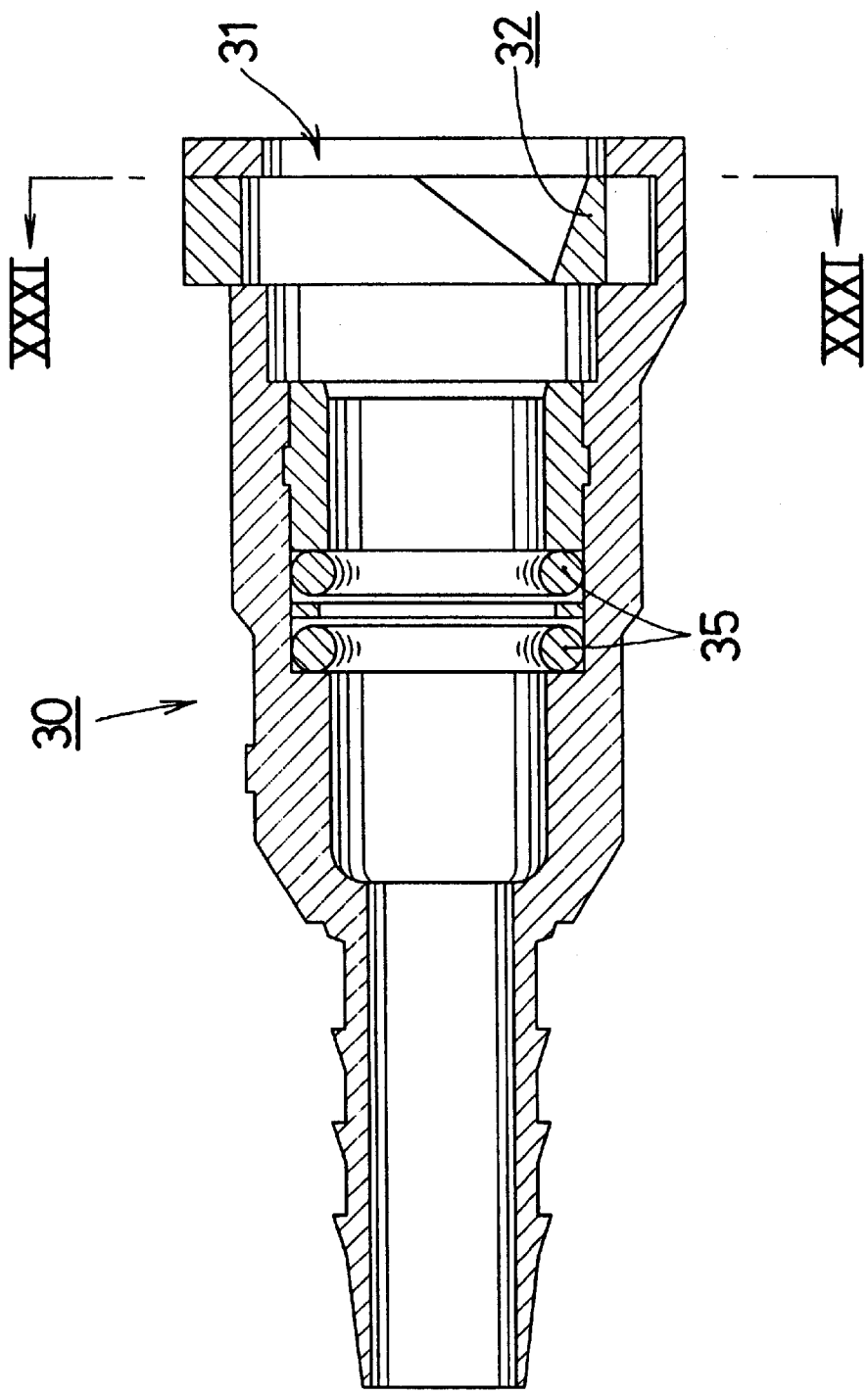
FIG. 30 is an axial section view of a female member housing a manipulating ring in a conventional connector.
Figure 31:
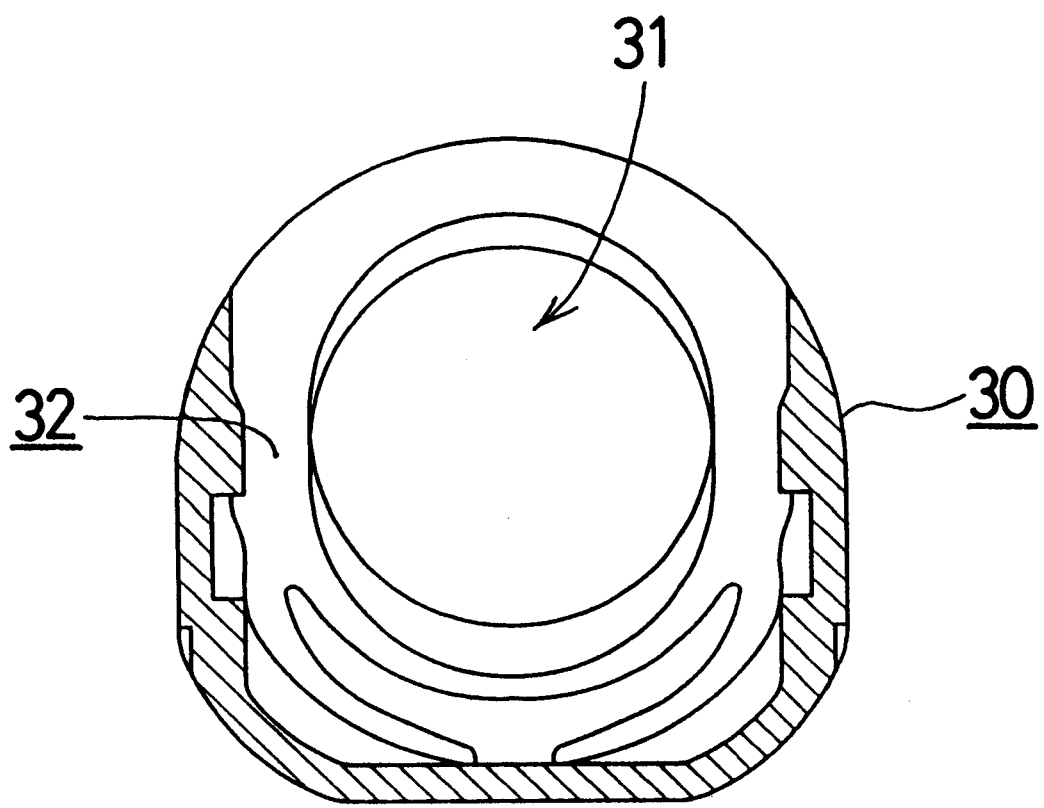
FIG. 31 is a line XXXI—XXXI section view of FIG. 30.

As shown in FIG. 23, the manipulating members 3 are provided with joining parts 214 at inner end parts thereof. The respective joining parts 214 enter a track region of the engaging portion 6, as shown in FIG. 24. Each of the manipulating members 3 has also an elastic joining piece 207 and an elastic guide piece 208. These elastic pieces 207, 208 respectively abut with an inner peripheral face 209 of the female member 1, and thrusting forces of these elastic pieces 207, 208 enables to maintain the coupling state where the manipulating members 3 respectively enter the track region. As clearly shown in FIG. 24, in the coupling state, the manipulating members 3 are designed to extend on and along the outer face of the male member 2 and engage with it with a large area, while, as clearly shown in FIG. 25, in a released state, the respective members 3 rotatingly move outwardly to retreat from the coupling position.

When detaching or attaching the male member 2, bases of the manipulating members 3 are pushed inwardly so that the manipulating members 3 rotate and move outwardly to retreat from the coupling position where the manipulating members enter the track region, and thereby the full track region becomes clear for receiving the male member 2 or the engagement between the manipulating member 3 and the engaging portion 6 becomes released. Namely, resisting the thrusting force of the elastic joining and removal guide pieces 207, 208, the manipulating members 3 are displaced to retreat from the coupling position.

In this embodiment, the pair of manipulating members 3 are designed to rotate and move outwardly to retreat from the coupling position. On the other hand, for instance, in the first embodiment, the manipulating members 3 are pushed at the bases 15 and moved straightly toward the opposite inner wall sides of the female member, as shown in FIGS. 6 and 7. Compared with the first embodiment, the manipulating members 3 of the fourth embodiment may have a larger engaging area of parts which the members 3 enter and occupy in the track region and engage with the engaging portion, an area of the portions along the inserting directions of the manipulating members 3. The portions here mean the central upper and lower portions of the engaging area which engage with the engaging portion 6 in FIG. 24, but not engage therewith in FIG. 6. Consequently, the fourth embodiment can provide an enhanced coupling strength than the first embodiment.

Besides, since the pair of manipulating members 3 are inserted into the female member 1 in opposite inward directions and designed to be kept in the coupling position in a usual state, attachment and detachment of the male member 2 into and out of the female member 1 can be readily conducted by inserting the male member 2 into the female member 1 or pulling the former out of the latter by an operator's one hand while pushing the paired manipulating members 3 into the female member 1 by the other hand. So the manipulation is very simple.

Simple structures of the elastic coupling and guide pieces 207, 208 advantageously allows the manipulating members 3 to reliably maintain the coupling state where the joining parts 214 stay in the track region. And this simple structure as well as the simple manipulation of the manipulating members 3 enable easy retreat of the manipulating members 3 from the coupling position.

Moreover, since the paired manipulating members 3 are designed to rotate and move outwardly when being pushed into the female member 2, the length thereof in the insertion direction may be set shorter than that of the connector in the first embodiment. The difference can be seen in comparison between FIGS. 6 and 24.

Referring again back to FIGS. 6 and 7, each of the joining parts 14 of the manipulating members 3 enter the track region about a quarter circular arc thereof. As stated above, reliability of the coupling with the male member 2 depends on, for instance, the size of the area which the manipulating members 3 occupy in the track region. And a fifth embodiment according to a connector of the present invention, which is capable of further reliable coupling of the female and male members 1, 2, is illustrated in FIGS. 26 to 29. The connector includes likewise a synthetic resin female member 1, a male member having a fluid passage 10, and a pair of manipulating members 3.

The female member receives in its inner space the engaging portion 6 of the male member 2 through and behind the manipulating members 3. The pair of manipulating members 3 are inserted in the female member 1 from opposite sides. As clearly shown in FIG. 27, each manipulating member 3 includes an elastic joining piece 307, a removal preventing piece 308, and a joining part 314. The joining part 314 enters the annular track region about a half circular arc thereof. This coupling position is maintained by the thrusting action of the elastic joining piece 307. The joining part 314 abuts against an associated stepped part 309 provided on the counter manipulating member 3.

When detaching or attaching the male member 2, the joining parts 314 of the paired manipulating members 3 are moved to retreat from the coupling position to clear the full track region of the engaging portion 6 or disengage from the engaging portion 6.

In this fifth embodiment, each joining part 314 enters the annular track region and occupies about a half circular arc thereof and the size of the area which the joining part 314 occupies in the track region is increased. Therefore, further reliable coupling between the female and male members 1, 2, is obtained.

Moreover, the thrusting action by the elastic joining pieces 307 with simple structure maintains the male member 2 and the manipulating members 3 in the coupling state. Therefore such a simple structure of the elastic joining pieces 307 allows to reliably maintain the coupling state.

In addition, the joining parts 314 of the paired manipulating members 3 are designed to engage with the respective associated stepped parts 309 on the counter manipulating members 3 and be positioned stably with respect to each other. Therefore loose engagement between the paired members 3 is effectively prevented. Besides, the pair of manipulating members 3 are designed to be hooked on the female member 1 by the removal preventing pieces 308 symmetrically as a whole, and thereby stability as a whole and simplicity of assembling are obtained.

Furthermore, since the pair of manipulating members 3 are provided into the female member 1 from opposite sides, the connectors are very handy in manipulation. Namely, attachment and detachment can be readily conducted by pushing the paired manipulating members 3 together into the female member 1 by an operator's one hand and simultaneously pulling the male member 2 out of or inserting it into the female member 1 by the other hand.

As described above, in the connector according to the present invention, since the engaging portion 6 of the male member 2 is engaged with the manipulating members 3 on both opposite sides in opposite inward direction from the inner circumferential wall side of the female member 1, more reliable coupling than in the prior art connectors can be obtained even when force in the withdrawal direction is applied on the male member 1.

What is claimed is:

1. A connector for detachably coupling a male member to a female member, wherein during coupling an outer face engaging portion of the male member is received in an inner space of said female member, said connector comprising:
   a pair of manipulating members carried in said inner space of said female member; said manipulating members being respectively and integrally provided with joining parts, said female member being provided with a pair of slits at opposite peripheral wall parts of said female member, and said joining parts being respectively inserted into said pair of slits from opposite sides where said manipulating members are disposed independently of each other;
   said male member outer face engaging portion being received through and behind said manipulating members;
   said joining parts entering a track region of said engaging portion from opposite sides and engaging with said engaging portion; and
   wherein, when attaching and detaching said male member with said female member, said pair of manipulating members are moved in mutually opposite directions toward respective opposite peripheral wall sides of said inner space, said manipulating members in a coupling position being entered in said track region but retreating to a position clear of said track region for disengaging said male member from the female member.

2. A connector according to claim 1, wherein said pair of manipulating members are formed separately from said female member and retained by respective stepped parts provided on a peripheral guide wall of said inner space.

3. A connector according to claim 1, wherein said pair of manipulating members are provided with respective elastic pieces by which said manipulating members are maintained normally in said coupling position.

4. A connector according to claim 3, wherein, when attaching or detaching said male member, said pair of manipulating members are moved in mutually opposite directions resisting action of said elastic pieces.

5. A connector according to claim 1, wherein said joining part is provided with an abutting part so as to limit an outward movement of said joining part at an axially shifted position in the coupling state.

6. A connector according to claim 5, wherein said abutting part is formed in a step and said female member is provided with an movement arresting part to engage with said abutting part to prevent the outward movement of said joining part.

7. A connector according to claim 5, wherein said abutting part is formed in a slope and, along an axial movement of said joining part due to an imposition of a fluid pressure therein, said joining part moves inwardly along said slope and presses said male member.

8. A connector according to claim 5, wherein said engaging portion of said male member is a protruded portion.

9. A connector for detachably coupling a male member to a female member, wherein during coupling an outer face engaging portion of the male member is received in an inner space of said female member, said connector comprising:
   a pair of manipulating members carried in said inner space of said female member, said manipulating members being respectively and integrally provided with joining parts, said female member being provided a pair of slits a opposite peripheral wall parts of said female member, and said joining parts being respectively inserted into said pair of slits from opposite sides;
   said male member outer face engaging portion being received through and behind said manipulating members;
   said joining parts entering a track region of said engaging portion and engaging with said engaging portion; and
   wherein, when attaching and detaching said male member with said female member, said pair of manipulating members are pressed oppositely in the directions towards an axis of said female member and thereby respective of said manipulating members are as a whole rotated and moved in mutually opposite outward directions so as to retreat from a coupling position thereof where said parts of said manipulating members enter said track region to a position clear of said track region for disengaging said male member from the female member.

10. A connector according to claim 9, wherein each of said manipulating members is provided with an elastic joining piece and an elastic guide piece and thrusting action of said elastic joining and guide pieces allows said manipulating members to be maintained in said coupling position.

11. A connector according to claim 10, wherein, when attaching or detaching said male member, said manipulating members are moved resisting said thrusting action of said elastic pieces to retreat from said coupling position.

12. A connector according to claim 9, wherein said engaging portion of said male member is a protruded portion.

13. A connector according to claim 9, wherein said joining part is provided with an abutting part so as to limit an outward movement of said joining part at an axially shifted position in the coupling state.

14. A connector according to claim 13, wherein said abutting part is formed in a step and said female member is provided with a movement arresting part to engage with said abutting part to prevent the outward movement of said joining part.

15. A connector according to claim 13, wherein said abutting part is formed in a slope and, along an axial movement of said joining part due to an imposition of a fluid pressure therein, said joining part moves inwardly along said slope and presses said male member.

16. A connector for detachably coupling a male member to a female member, wherein during coupling an outer face engaging portion of the male member is received in an inner space of said female member, said connector comprising:
   a pair of manipulating members being respectively and integrally provided with joining parts, said manipulating members being inserted in said inner space of said female member utilizing elasticity of said manipulating members to be disposed therein oppositely each other;
   said male member outer face engaging portion being received through and behind said manipulating members;
   said joining parts entering an annular track region of said engaging portion about a half circular arc thereof and engaging with said engaging portion; and
   wherein, when coupling and removing said male member, said manipulating members are moved to retreat from a coupling position where said joining parts enter said track region to a position clear of said track region for disengaging said male member from said female member.

17. A connector according to claim 16, wherein each of said manipulating members is provided with an elastic joining piece and a removal preventing piece, and allowed to be maintained in said coupling position due to thrusting action of said joining piece.

18. A connector according to claim 16, wherein said pair of manipulating members are mutually positioned due to abutment of associated stepped parts on respective counter manipulating members.

19. A connector according to claim 16, wherein said joining part is provided with an abutting part so as to limit an outward movement of said joining part at an axially shifted position in the coupling state.

20. A connector according to claim 19 wherein said abutting part is formed in a step and said female member is provided with an movement arresting part to engage with said abutting part to prevent the outward movement of said joining part.

21. A connector according to claim 19, wherein said abutting part is formed in a slope and, along an axial movement of said joining part due to an imposition of a fluid pressure therein, said joining part moves inwardly along said slope and presses said male member.

22. A connector according to claim 16, wherein said engaging portion of said male member is a protruded portion.

\* \* \* \* \*